US012063484B2

United States Patent
Hansen et al.

(10) Patent No.: US 12,063,484 B2
(45) Date of Patent: Aug. 13, 2024

(54) MICROPHONE ARRAY APPARATUS FOR BIRD DETECTION AND IDENTIFICATION

(71) Applicant: Soundtrace LLC, Sunnyvale, CA (US)

(72) Inventors: Christopher James Hansen, Los Altos, CA (US); Siu Hung Siu, Los Altos, CA (US)

(73) Assignee: Soundtrace LLC, Sunnyvale, CA (US)

( * ) Notice: Subject to any disclaimer, the term of this patent is extended or adjusted under 35 U.S.C. 154(b) by 257 days.

(21) Appl. No.: 17/321,417

(22) Filed: May 15, 2021

(65) Prior Publication Data

US 2021/0368264 A1    Nov. 25, 2021

Related U.S. Application Data

(60) Provisional application No. 63/116,697, filed on Nov. 20, 2020, provisional application No. 63/029,381, filed on May 22, 2020.

(51) Int. Cl.
*H04R 3/00* (2006.01)
*G01P 15/18* (2013.01)
(Continued)

(52) U.S. Cl.
CPC .............. *H04R 3/005* (2013.01); *G01P 15/18* (2013.01); *G10L 25/18* (2013.01); *G10L 25/51* (2013.01);
(Continued)

(58) Field of Classification Search
None
See application file for complete search history.

(56) References Cited

U.S. PATENT DOCUMENTS

| 5,452,364 A | 9/1995 | Bonham |
| 7,377,233 B2 * | 5/2008 | Patton ................. A01K 11/008 381/56 |

(Continued)

FOREIGN PATENT DOCUMENTS

| CA | 2089597 A | 8/1994 |
| CN | 112289326 A | 1/2021 |

OTHER PUBLICATIONS

"The Gauss-Newton Method", Section 14.1 of: Michel Bierlaire, Optimization: Principles and Algorithms (EPFL Press, Lausanne, Switzerland, 2015), pp. 334-336.
(Continued)

*Primary Examiner* — Paul W Huber
(74) *Attorney, Agent, or Firm* — Franklin Schellenberg

(57) ABSTRACT

A portable birdfinding device comprising a plurality of PDM microphone sensors (e.g. a microphone array) coupled to processing electronics that electronically filter the acoustic signals to detect sounds from birds, and to interpret the acoustic signals to identify the angle-of-arrival (e.g. azimuth and elevation) and distance from which the bird sound is coming. Additional electronic processing may provide an identification of the bird species. In some embodiments, the microphone array may have sensors spaced so that sounds from distant birds have a different time of flight to reach the different microphone sensors, while having the spacing between microphones be less than half of the wavelength for sounds made by a predetermined bird species. The microphone array may be positioned onto an object wearable by the birdwatcher, such as a hat or a jacket. In some embodiments, the electronic processing may be carried out using a smartphone.

24 Claims, 18 Drawing Sheets

(51) Int. Cl.
*G10L 25/18* (2013.01)
*G10L 25/51* (2013.01)
*H04R 1/08* (2006.01)
*H04R 1/40* (2006.01)
*H04R 19/04* (2006.01)
*H02S 99/00* (2014.01)
*H04W 84/12* (2009.01)

(52) U.S. Cl.
CPC ............... *H04R 1/08* (2013.01); *H04R 1/406* (2013.01); *H04R 19/04* (2013.01); *H02S 99/00* (2013.01); *H04R 2201/003* (2013.01); *H04R 2201/023* (2013.01); *H04R 2201/401* (2013.01); *H04R 2420/07* (2013.01); *H04W 84/12* (2013.01)

(56) References Cited

U.S. PATENT DOCUMENTS

| | | | |
|---|---|---|---|
| 7,454,334 | B2 | 11/2008 | Agranat |
| 7,777,747 | B1 | 8/2010 | Krenz |
| 7,960,637 | B2* | 6/2011 | Lemons ................. G10L 21/06 84/464 R |
| 9,058,384 | B2 | 6/2015 | Berres |
| 9,089,123 | B1* | 7/2015 | Thomas ............... A01M 31/002 |
| 9,432,770 | B2* | 8/2016 | Nguyen ................. H04R 3/005 |
| 9,805,739 | B2 | 10/2017 | Nongpiur et al. |
| 9,949,056 | B2* | 4/2018 | Ranieri ................. H04R 25/43 |
| 10,140,515 | B1* | 11/2018 | Waldo ................... G06F 16/639 |
| 10,194,650 | B2 | 2/2019 | Byerly |
| 10,455,342 | B2* | 10/2019 | Kim ................... G08B 21/0208 |
| 10,659,873 | B2* | 5/2020 | Elko ....................... H04R 5/027 |
| 10,979,805 | B2* | 4/2021 | Chowdhary .............. B81B 7/00 |
| 11,646,725 | B2* | 5/2023 | Fan ........................ H03K 5/135 381/113 |
| 2004/0107104 | A1 | 6/2004 | Schaphorst |
| 2010/0322483 | A1 | 12/2010 | Margolis |
| 2011/0273964 | A1 | 11/2011 | Agranat |
| 2012/0209612 | A1 | 8/2012 | Bilobrov |
| 2013/0127980 | A1* | 5/2013 | Haddick .................. G06F 3/013 348/14.08 |
| 2016/0252325 | A1* | 9/2016 | Sammut .................. G01S 19/13 42/122 |
| 2018/0034470 | A1* | 2/2018 | Fan ........................ H03M 3/462 |
| 2019/0294169 | A1* | 9/2019 | Shabtai ................. G05D 1/0255 |
| 2020/0273484 | A1 | 8/2020 | Doerr et al. |
| 2021/0043167 | A1* | 2/2021 | Cartier ................... H04R 1/028 |

OTHER PUBLICATIONS

"MP34DT01-M MEMS audio sensor omnidirectional digital microphone" Datasheet from STMicroelectronics, Geneva, Switzerland, Sep. 2014 (16 pages) Document Ref. IFX-qko1485967505603 Available at www.st.com/en/audio-ics/mp34dt01-m.html.

"IM69D130 High performance digital XENSIV™ MEMS microphone" Datasheet from Infineon Technologies, Munich, Germany, Edition 2014 (17 pages) Document Ref. DocID026514 Rev 3.

"Adafruit PDM Microphone Breakout" Datasheet from Adafruit Industries, New York, NY, Sep. 4, 2019 (16 pages) Available at: learn.adafruit.com/adafruit-pdm-microphone-breakout.

Gerald Coley, "Beaglebone Black System Reference Manual" Manual from Beagleboard.org, Revision A5.2 (Apr. 11, 2013) Available from: cdn-shop.adafruit.com/datasheets/BBB_SRM.pdf Updated online versions available at: github.com/beagleboard/beaglebone-black/wiki/System-Reference-Manual.

* cited by examiner

MICROPHONE ARRAY APPARATUS FOR BIRD DETECTION AND IDENTIFICATION

CROSS-REFERENCE TO RELATED APPLICATIONS

This patent application claims the benefit of U.S. Provisional Patent Application No. 63/029,381, filed on May 22, 2020, and the benefit of U.S. Provisional Patent Application No. 63/116,697, filed on Nov. 20, 2020, both of which is also incorporated herein by reference in its entirety.

FIELD OF THE INVENTION

The invention disclosed in this Application relates to electronic devices for use in identifying birds from their acoustic signature.

BACKGROUND OF THE INVENTION

Birds have distinctive vocalizations that a birdwatcher can use to note the presence of a bird, determine its position, and identify the bird. However, in the ambient environment, acoustic noise and other distractions may make it difficult to pinpoint the location of the origin of the bird vocalizations and to identify the bird species.

Identification of birds from recordings of ambient sounds have been used to identify birds after the fact, but using these in real time to identify a live bird in the field is problematic, and they generally do not identify the location or direction of the origin of the sound when the position is unknown.

There is therefore a need for a portable birdfinding device that can be used by a birdwatcher in the field to detect bird vocalizations in real-time that can identify the direction of the origin of the sound, and furthermore be able to match the properties of the detected sounds to a library of known bird songs.

BRIEF SUMMARY OF THE INVENTION

The invention disclosed in this Application provides a portable birdfinding device for detecting bird vocalizations comprising a microphone array, with the selection of the microphones in the array being chosen to detect sounds at frequencies generally produced by birds of interest (typically occurring between 1.5-8.0 kHz). The microphone array is coupled to signal processing electronics that electronically filter the signals to isolate an acoustic spectrum of interest (e.g. a band around 2.5 kHz for detecting mockingbirds) and interpret the signals from the microphone array to identify the direction from which the sound is coming. Additional processing may also be applied to provide a tentative automatic identification of the species.

The microphone array comprises a plurality of microphone sensors, with at least some of the sensors spaced far enough apart so that sounds from distant origins have a different time of flight to reach the microphone sensors. In some embodiments, the spacing between microphones will be less than half of the wavelength corresponding to the acoustic frequency of interest. In some embodiments, the microphone array may comprise 4 microphones, arranged in a linear array. In some embodiments, the microphone array may be arranged in a planar circular or oval arrangement. In some embodiments, the microphones in the microphone array may be positioned in two or more planes, enabling both azimuth and altitude for the sound source to be determined.

In some embodiments, each microphone in the array is positioned with a predetermined position relative to each of the other microphones in the array. In some embodiments, one or more of the microphones in the microphone array is a pulse density modulation (PDM) Microphone. In some embodiments, the microphone array may be positioned onto an article of manufacture wearable by the birdwatcher, such as a hat.

In some embodiments, the microphones in the microphone array may all be connected using wires to a locally powered electronic unit for preliminary signal processing, and the processed signals then be relayed wirelessly to a computer or mobile device for further processing and analysis. In some embodiments, electricity to power the preliminary signal processing may be supplied by a replaceable battery. In some embodiments, electricity to power the preliminary signal processing may be supplied by electrical power from a wearable solar panel.

In some embodiments, one or more filters are used to process and downsample each microphone datastream. In some embodiments, microphone signals are combined and used to make a computation of the angle-of-arrival for the acoustic signal relative to the microphone array, and these results are in turn used to synthesize a single combined signal from the multiple microphone datastreams.

DETAILED DESCRIPTIONS OF EMBODIMENTS

I. Physical Configurations.

The various embodiments of the invention disclosed in this Application comprise a microphone array, arranged to detect vocalizations of birds and coupled to processing electronics to filter the signals to isolate frequencies corresponding to particular bird vocalizations and determine the direction from which the vocalizations are coming.

Although the term "array" is used for the microphones, this is not intended to refer to the more rigid definition of an array as a structure having elements arranged in fixed columns and rows. Rather, "microphone array" should be understood here to mean a configuration of a plurality of microphones arranged with predetermined relationships, such that the relative orientation, positions, and therefore distances between the microphones are known.

The microphones in the array can be any sound detectors that convert sound to electronic signals, but are preferable small, lightweight electronic microphones such as MEMS (Micro-Electro-Mechanical System) digital microphones having a pulse-density modulated (PDM) output. Examples of PDM MEMS microphones suitable for embodiments of the invention are MP34DT01-M MEMS audio sensor omnidirectional digital microphones manufactured by ST Microelectronics, or IMD69D130 high performance digital XENSIV™ MEMS microphones manufactured by Infineon.

Figure 1:
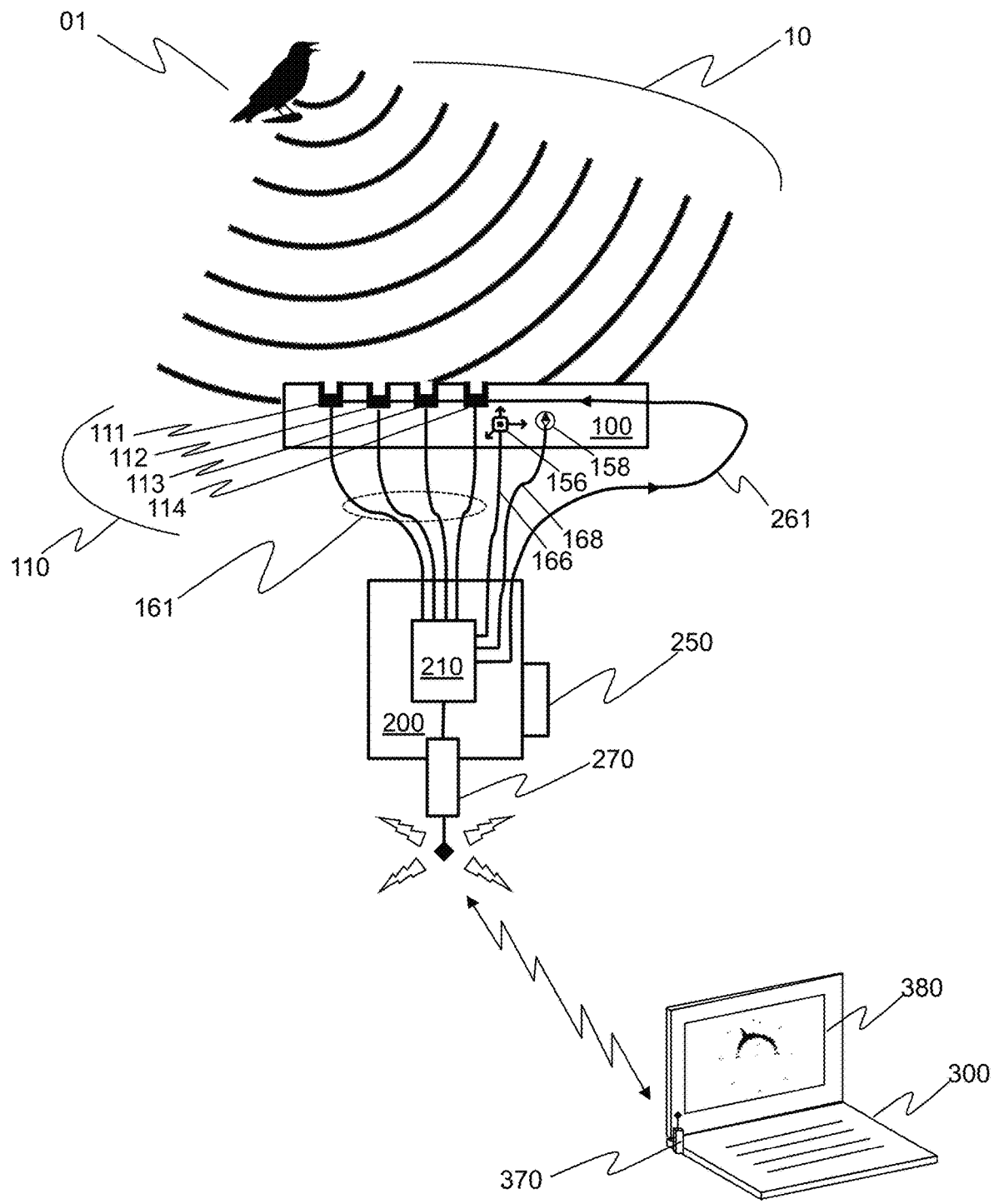
FIG. 1 illustrates a schematic of a birdfinder according to an embodiment of the invention.

FIG. 1 illustrates a representative schematic of an embodiment for the detection of sounds 10 from a bird 01. The embodiment illustrated comprises a microphone array 110 of four (4) microphones 111, 112, 113, 114, although any plurality of microphones may be used. The microphones 111, 112, 113, 114 of the array 110 are arranged on a single supporting structure 100, which may be a single structure as illustrated (such as an electronic breadboard), or some other support structure.

The four (4) microphones 111, 112, 113, 114 are connected to a local electronic controller 200 having a power source 250 and a local electronic signal processing unit 210 for computational signal processing. In the embodiment as shown, the power source 250 provides electrical power to both the electronics in the local electronic signal processing unit 210 and also to the microphone array 110 through a common connecting cable 261 that provides power, ground, and clock signals from the local electronic controller 200. As shown, another set of connectors 161 provide a data line from each microphone 111-114 to the common local electronic signal processing unit 210.

The microphone array may also have associated with it one or more accelerometers 156 that can provide data on the relative motion and orientation of the microphone array, that can be used in turn in the calculation of the direction of origin from which sounds are propagating. The accelerometer 156 is illustrated in FIG. 1 as being a single device mounted to the supporting structure 100 and having its own dedicated connector 166 to the local electronic controller 200, but other configurations in which each individual microphone is also paired with an accelerometer may also be used.

The microphone array may also have associated with it one or more orientation devices 158 such as a compass or a GPS sensor that can provide data on the absolute and relative position of the microphone array with respect to the Earth or local environment, that can be used in turn in the calculation of the direction of origin from which sounds are propagating. The orientation device 158 is illustrated in FIG. 1 as being a single device mounted to the supporting structure 100 and having its own dedicated connector 168 to the local electronic controller 200, but other configurations in which each individual microphone is also paired with an orientation device may also be used.

Although as illustrated the set of connectors 161 are shown as having one dedicated connector for each microphone, use of common bus communications protocols may also allow multiplexed signals from the microphones to be simultaneously connected to the processing unit using a single connector. Other embodiments may be configured so that a single cable provides both power and data connections to the microphone array 110. Likewise, in some embodiments, any attached accelerometers or orientation devices (e.g. compasses) may use dedicated connectors for each device, may all be connected using a common cable, or be combined with the microphone data lines using a single connecting bus.

The microphones are preferably positioned to be omnidirectional, that is detecting sounds coming from all directions. The microphones of the microphone array are also preferably positioned so that the distance between them is less than one half the wavelength of the sounds to be detected. A 2.5 kHz mockingbird bird vocalization at sea level (speed of sound at 20° C.~343 m/s) corresponds to a wavelength of ~13.7 cm, and therefore to detect mockingbird calls, a corresponding microphone separation of less than or equal to 6.85 cm would be needed. For detecting bird vocalizations of higher frequencies, smaller separations would be used. It is preferable that the relative positions of the microphones be fixed and also precisely known, so that the phase differences between signals from the microphones can be related to the time difference for sound propagation to the various microphones, enabling the relative sound source direction to be determined.

Referring again to FIG. 1, the signals from the microphones are then processed by the local electronic signal processing unit 210. This may be a dedicated circuit design, or a more general purpose digital signal processing computer. This local electronic signal processing unit may also be used to provide the clock signals to the microphones, and also provide initial filtering of the signals to isolate certain desired frequencies while subtracting noise. Such a signal processing unit may be provided by a simple computer such as, for example, the Beagleboard brand of single-board ARM processors produced by Texas Instruments, Inc.

The local electronic signal processing unit 210 may provide initial filtering, so that only signals related to sounds within a particular frequency range may be selected. This selection may be predetermined, or in some embodiments, programmed by the user. The local signal processing unit may be configured for noise analysis and reduction, subtracting common signals such as wind noise that may be present in the microphone signals but not related to the bird songs of interest. The filtering may be additionally programmed to have particular distributions, such as a Gaussian distribution with a selected center frequency and predetermined bandwidth, or may have a more complex distribution in both time and frequency, designed, for example, to detect correlations with particular known frequency varying bird calls characteristic of particular species, or to provide "noise cancelling" functions, subtracting unwanted signals such as nearby aircraft or automobile engines.

The local electronic signal processing unit 210 may in turn be connected to a secondary signal processing unit 300. The connectors for this may be provided by wires carrying electronic signals, or, as illustrated, by a wireless connection using wireless connector 270 attached to the local electronic controller 200 and another wireless connector 370 attached to the secondary signal processing unit 300. A wireless connection may be established using Wi-Fi protocols according to standard IEEE 801.11 (such as IEEE 801.11n (WiFi 4)). Such a wireless connection may be provided using, for example, a Panasonic N5HBZ0000055 Wi-Fi Adapter as a wireless communication broadcasting device using radio frequencies. Other wireless protocols may also be used, such as the Bluetooth standards maintained by the Bluetooth Special Interest Group.

The secondary signal processing unit 300 may be any computing platform, including common laptop or notebook computers running Apple OS, Windows, or Linux operating systems or tablet computers such as an Apple iPad or Microsoft Surface, or may be a mobile computing device such as a smartphone running an Apple iOS or Android operating system. Once the signals are received by the secondary signal processing unit 300, further processing and computations are carried out, comparing the time dependent signals from the various microphones in the microphone array and determining relative amplitude and phase differences. From the phase differences and the known positions of the microphones, time delays for the same signal to arrive at each of the microphones can be determined, and the relative angle for the origin of the sound to the microphone array can be calculated, providing a direction of origin. If enough microphones are present in the microphone array, azimuth, elevation, and range (i.e. the distance) for the sound source can be calculated. These values can then be presented to the user on a display 380.

Figure 2:
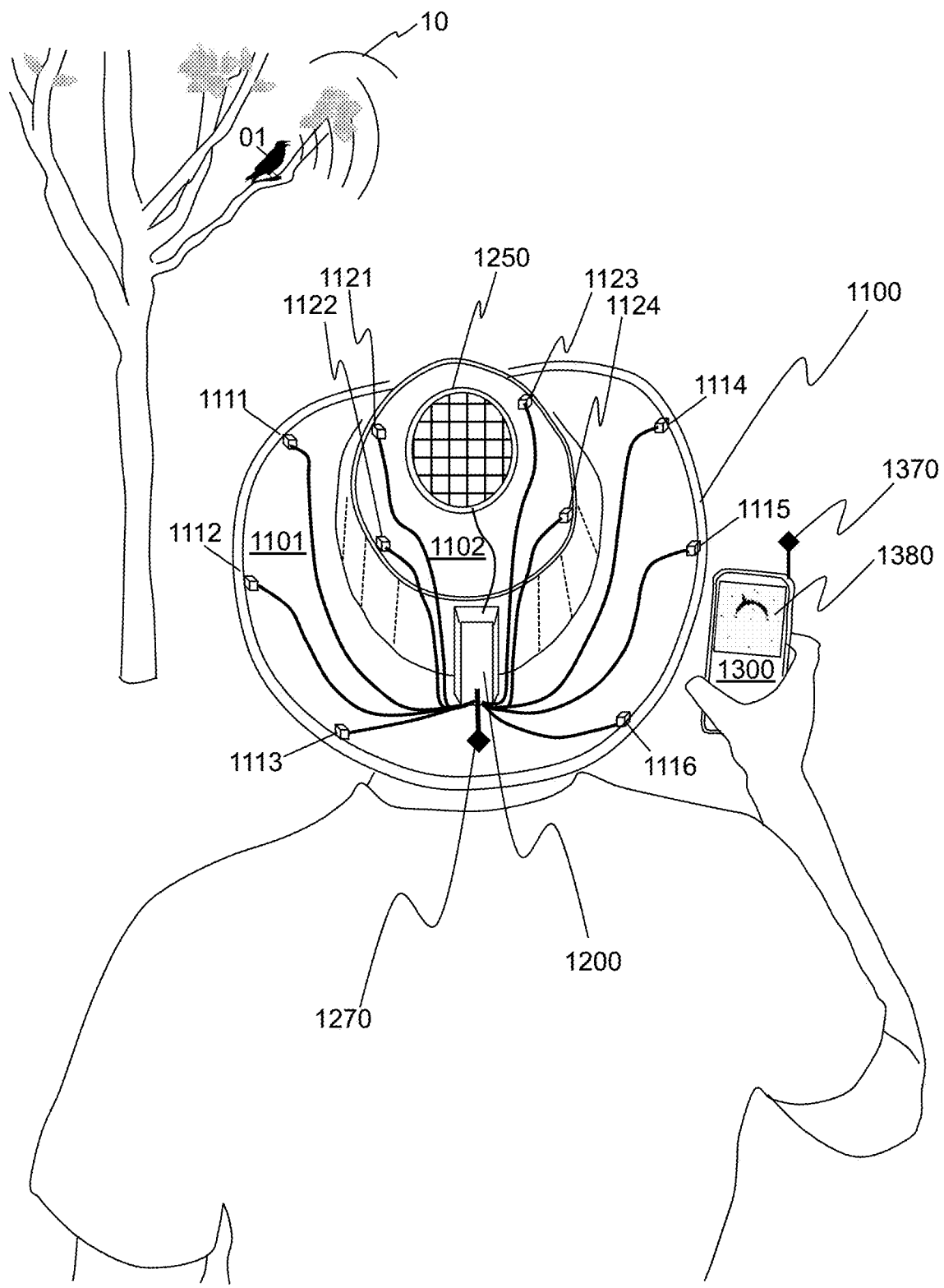
FIG. 2 illustrates a schematic of a birdfinder according to an embodiment of the invention wherein the microphone array is mounted on a hat.

FIG. 2 illustrates another embodiment of the invention. Again, a bird 01 produces sounds 10 that propagate through the air. However, for this embodiment, the microphone array comprises ten (10) microphones 1111-1116 and 1121-1124 that are securely attached to an item worn by a birdwatcher in the field, in this case, a hat 1100. The hat 1100 has two tiers, a wider brim 1101 to which six (6) microphones 1111-1116 are attached, and a crown 1102 to which four (4) additional microphones 1121-1124 are attached. Each microphone is connected to a local electronic controller 1200 comprising a local electronic signal processing unit. In this illustration, a single cable for each microphone provides the power, ground, and clock signals to the microphone, as well as conveying the data from the microphone. A solar panel 1250 provides electrical power to the local electronic controller (and, in turn, to the microphone array), although a battery may also be used (and, in some embodiments, a battery in conjunction with a solar power source may also be used for energy storage).

The hat 1100 is preferably semi-rigid, so that the relative positions of the microphones remain stable. In some embodiments, a specially designed hat having microphones attached to a rigid ring around the brim (and to another rigid ring on the top, if that configuration is used) to secure the relative positions of the microphones may be used, even if the brim itself remains soft and flexible. In some embodiments, one or more accelerometers (not shown) may be used either mounted on the hat, or used in tandem with some or all of the microphones in the microphone array to provide information about changes in positions of the microphones and/or the microphone array. In some embodiments, the accelerometers may be individually connected to the local processing unit in the local electronic controller 1200. In some embodiments, the accelerometers may be connected through a communication bus.

The local electronic signal processing unit in the local electronic controller 1200 communicates wirelessly through a wireless interface 1270 to a handheld smartphone 1300, which serves as a secondary processing unit. The handheld smartphone 1300 comprises a receiving antenna 1370, shown in the illustration as an external antenna, but more typically built in to the physical Wi-Fi configuration of the smartphone. Software on the smartphone 1300 analyzes the signals from the various microphones, and compares the relative phase of corresponding audio signals to compute a relative direction from which the sound is estimated to propagating. The direction of origin of this sound relative to angle may be displayed on the display 1380 of the smartphone using commonly deployed data display software.

In coordination with the position/acceleration sensors traditionally built into such mobile phones, and accessed by any number of commonly available apps, the display of the angular origin of the sound may in turn be coordinated with various position sensing apps commonly available for mobile phones, and the actual estimated location of the origin of the bird vocalization may be displayed.

II. Prototype Example.

Figure 3:
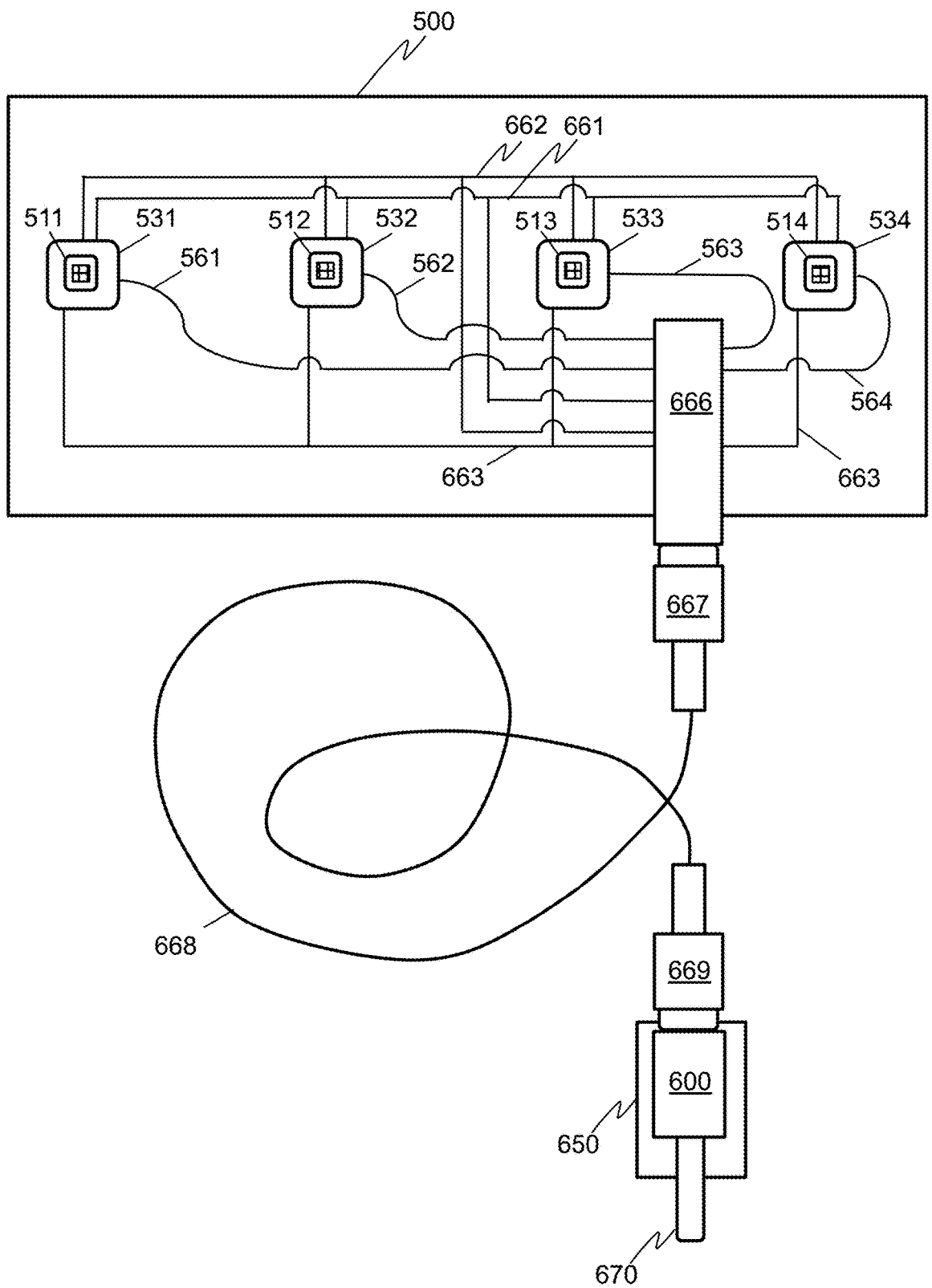
FIG. 3 is a schematic of the data collection unit of a prototype of an embodiment of the invention having a microphone array of four (4) microphones.

FIG. 3 illustrates a schematic for a prototype system for an embodiment of the invention fabricated using an electronic breadboard. The prototype comprises an electronic breadboard 500 of length ~30 cm with four (4) microphones 511, 512, 513 and 514 arranged in a linear microphone array. The spacing of the microphones is set to ~4.8 cm, smaller than the ~7.1 cm needed to detect phase differences within a single acoustic cycle for a mockingbird song at 2.5 kHz. For this prototype, the four (4) microphones 511-514 were ST Microelectronics MP34DT01-M MEMS audio sensor digital PDM microphones. These four (4) microphones 511-514 were each secured to an Adafruit PDM MEMS Microphone Breakout board 531, 532, 533, and 534, respectively, and mounted to the breadboard 500. Separate connections are provided through the electronic breadboard 500 to the breakout boards 531-534 with lines for power 661, ground 662, and a clock signal 663.

Each breakout board 531-534 also has a data connection 561, 562, 563, and 564, respectively, to provide the microphone signals from the microphones 511-514 to a junction connector 666. A cable 668 with two end connectors 667 and 669 provides a path for the data signals from the microphone array to be carried via a data line to a BeagleBone Black Single Board Computer, that functions as a local signal processing unit 600 processing the data signals into four audio streams. These processed audio streams are then broadcast using a wireless interface 670, such as a Wi-Fi connector using radio frequencies (RF).

Power is provided by a local electronic power source 650, in this case comprising a 5 volt battery, attached to the local signal processing unit 600. Power from the power source 650 down-converted to 3.3 volts to power the local electronic signal processing unit 600, and is carried through the cable 668 to the connector 666 on the breadboard 500, for distribution on the line for power 661.

Figure 4:
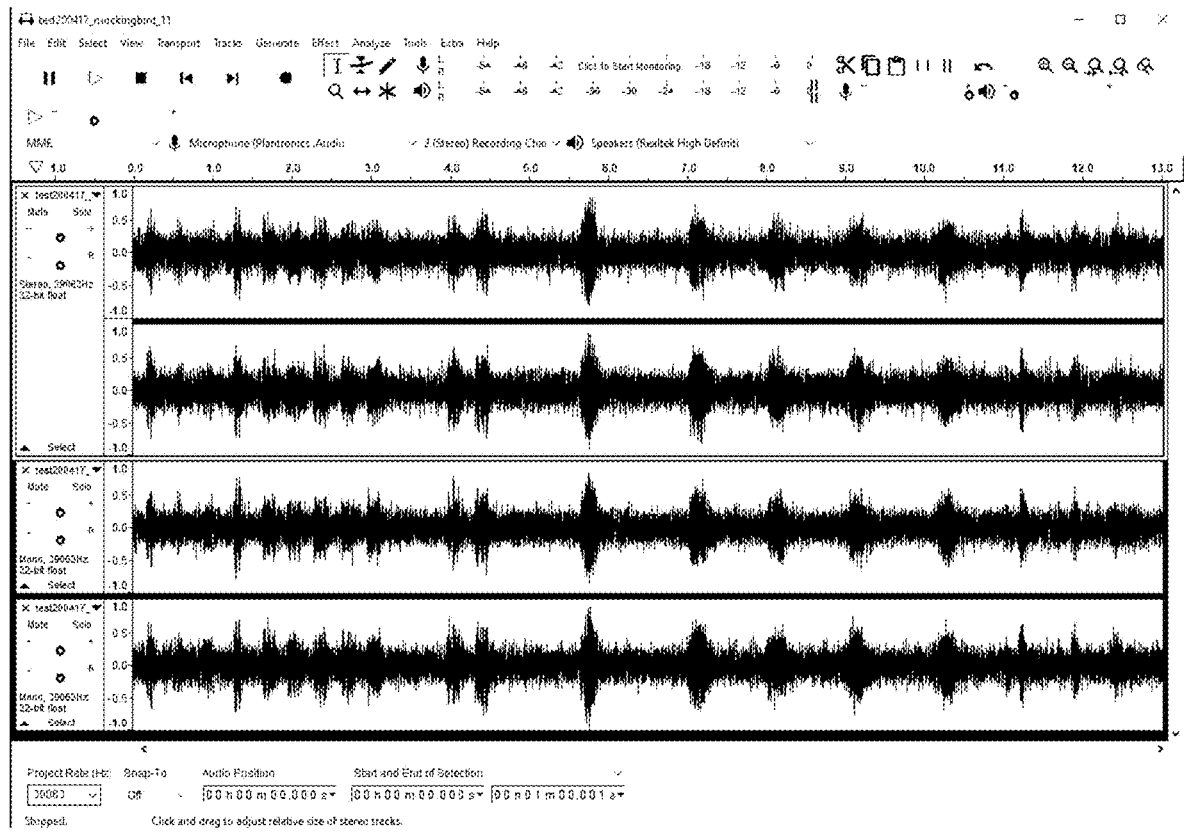
FIG. 4 illustrates four (4) acoustic data streams from a bird detected using the prototype illustrated in FIG. 3.

FIG. 4 shows an example of four (4) audio datastreams from the prototype of FIG. 3, displayed using the audio software program Audacity®. The timescale of the audio streams in FIG. 4 is seconds, and on this timescale, the amplitudes of the audio data streams are practically the same. However, after being carried over UDP packets via Wi-Fi to a host computer for processing, the audio streams can be analyzed using a much finer timescale.

Figure 5:
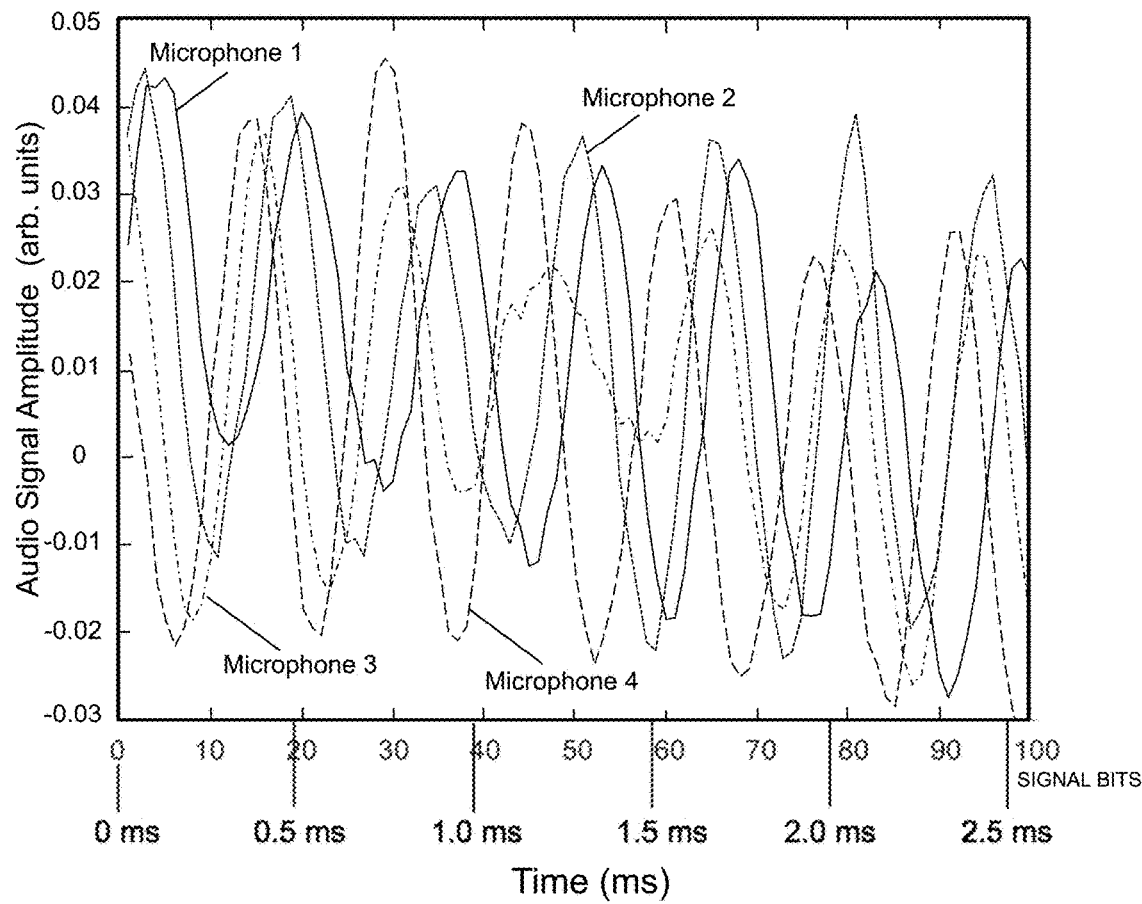
FIG. 5 illustrates four (4) acoustic data streams from a bird detected using the prototype shown in FIG. 3.

FIG. 5 illustrates the signals from the four (4) microphones used for the data in FIG. 4, plotted on the timescale of milliseconds. Clear phase shifts can be seen between the different microphone signals, corresponding to the different times of flight for the sounds from the same bird to reach the different microphones.

Figure 6:
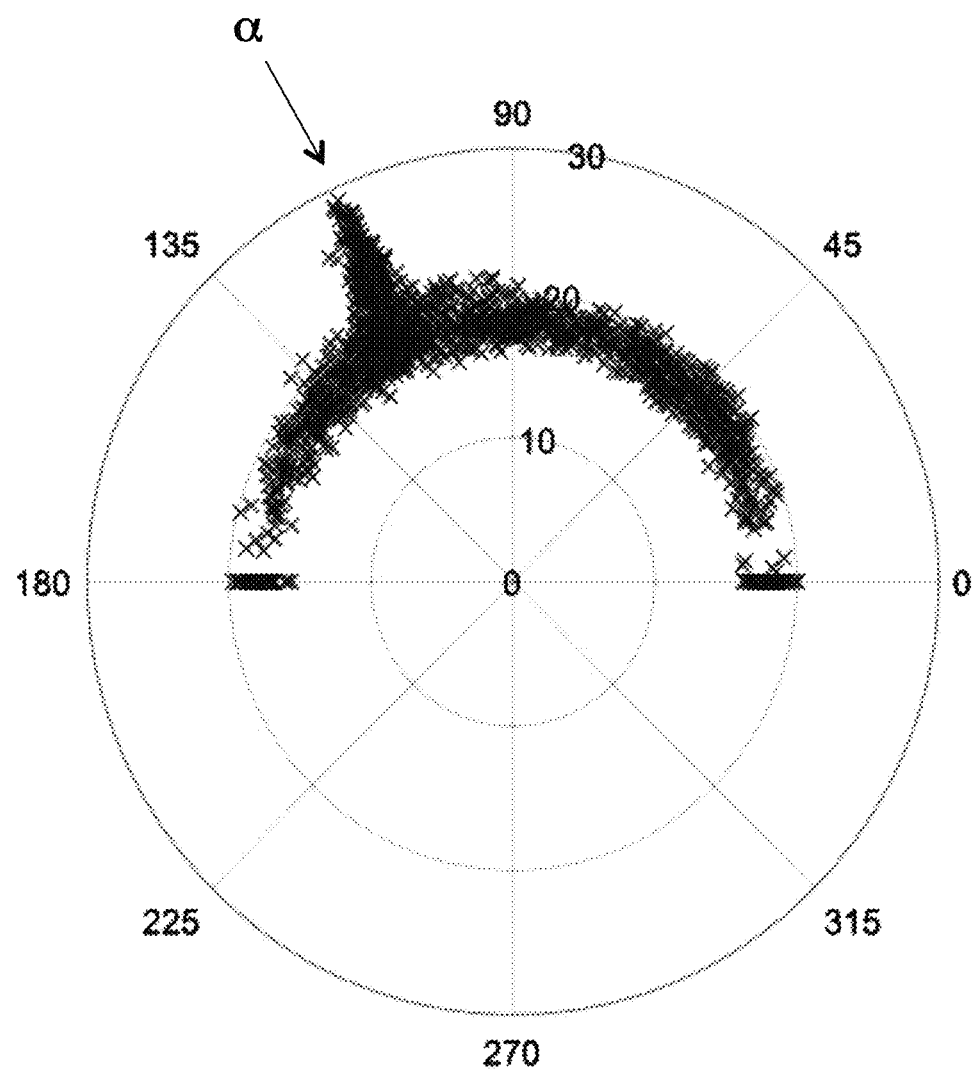
FIG. 6 illustrates the display of azimuth results for a bird detected using the prototype shown in FIG. 3.

By knowing the ambient speed of sound for the ambient conditions, the differences in signal phase can be used to calculate the angle and direction for the origin of the sound. FIG. 6 illustrates a plot of the sound intensity in decibels (dB) as a function of angle for the mockingbird signals generated by the signals in FIGS. 4 and 5. The angle-of-arrival for the identified bird is identified by the letter "a".

Given the speed at which these computations can be made using contemporary digital processing, it is possible for the unit to provide a real-time display of computed bird locations relative to the microphone array. The addition of one or more position/orientation sensing elements, such as accelerometers, digital compasses, and/or GPS systems or a combination thereof, to provide information about the position and/or orientation of the microphones in the microphone array, allows for the display to track the computed location of the bird relative to the position of the user even as the user (and microphone array) moves through the environment.

Coordination of the information from these sensing elements with the various position/orientation sensors that may be present in, for example, a mobile phone when used as a secondary signal processing unit may allow for real time display of possible bird locations on navigation or topographical maps within mobile apps, or to move and change relative to the display as the mobile phone is moved.

Such position/orientation sensing elements may be attached to the same supporting structure as the microphone array, sharing power from the local processing unit and providing data through an additional connector, or may be otherwise positioned relative to the microphone array and communicate directly (by, for example, an additional wireless communication link) with the secondary processing unit.

III. Additional Prototype and Signal Processing Examples.

FIG. 3 illustrated an example of a prototype system according to the invention having four (4) microphones arranged in a linear array. Other prototypes have been fabricated using two linear microphone arrays arranged perpendicular to each other in a planar configuration on a planar support structure. Each microphone array in this prototype had four (4) ST Microelectronics MP34DT01-M MEMS audio sensor digital microphones secured to an Adafruit PDM MEMS Microphone Breakout board. Signal processing was provided using an electronic breadboard for the computer positioned behind the planar support. The prototype comprises an electronic breadboard of length ~30 cm with four (4) microphones arranged in a microphone array. Processing is provided by a Texas Instruments Beaglebone Black single board computer using a TI AM335x processor, positioned behind the planar structure supporting the microphones. The prototype also has a USB Wi-Fi interface to communicate with off-board (remote) computer system for further processing.

Figure 7:
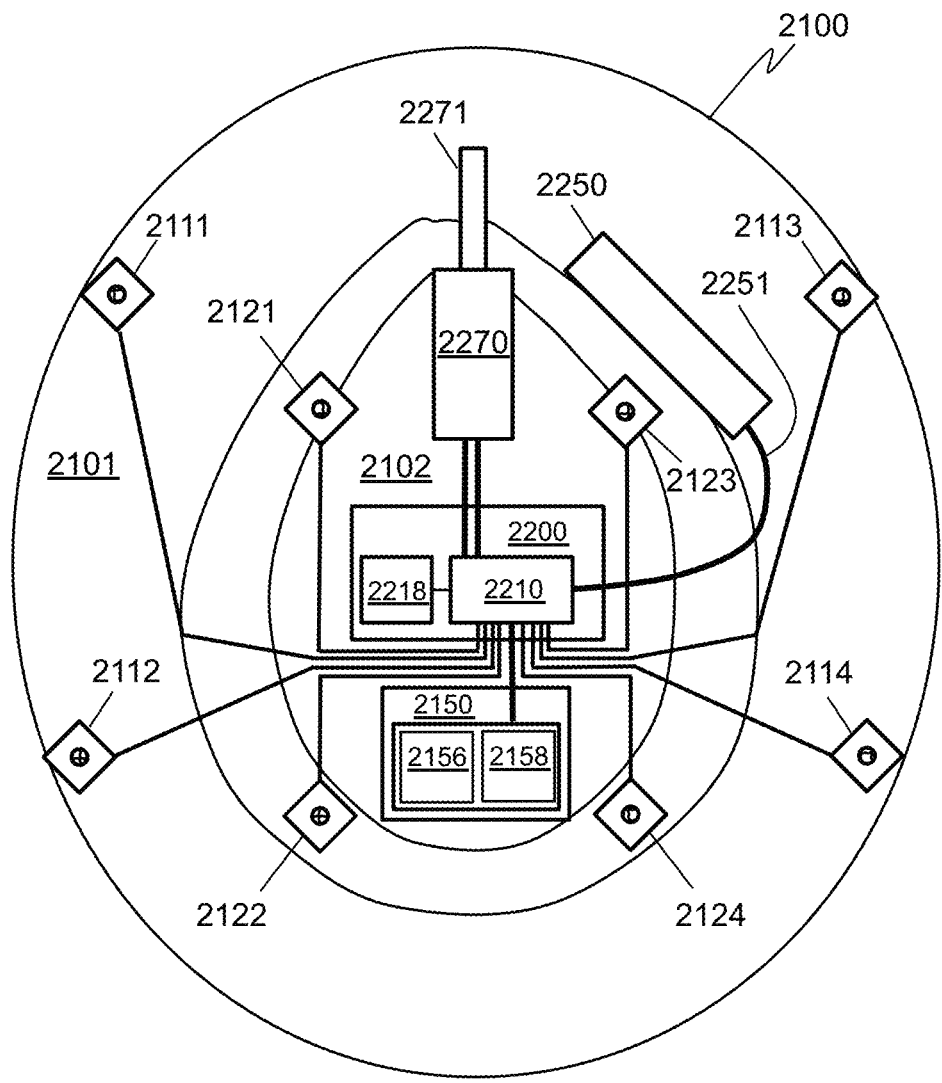
FIG. 7 is a schematic illustration of an embodiment of having a microphone array of eight (8) microphones mounted on a hat.

Another prototype of an embodiment of the invention, illustrated schematically in FIG. 7, has been fabricated with eight (8) PDM microphones mounted on Adafruit breakout boards as microphone units 2111-2114 and 2121-2124. The microphone units 2111-2114 and 2121-2124 are mounted on a item of clothing to be worn by a human as the support structure, in this case a hat 2100. Four (4) microphone units 2111-2114 are arranged around the brim 2101 of the hat, and the other four (4) microphone units 2121-2124 are arranged around the crown 2102 of the hat 2100. Each of the eight (8) PDM microphone units 2111-2114 and 2121-2124 is secured in place to the hat 2100 (which, in the embodiment as fabricated, was made of felt) by sewing the breakout boards of the microphone units 2111-2114 and 2121-2124 onto the hat 2100. In some embodiments, the microphone units, and may also be connected to the supporting hat and each other by using additional wire support structures, so that their relative position with respect to the hat remains stable while the user is in motion while wearing the hat.

Each of the PDM microphone units 2111-2114 and 2121-2124 is also connected electronically to a local electronic controller 2200. This controller 2200 comprises a local electronic signal processing unit 2210 (which, in this prototype, was a central ARM-based system-on-chip (SoC) computer, specifically, a system model OSD3358-SM provided by Octavo Systems, which uses a TI AM3358-SM processor) positioned on a breadboard placed on the crown 2102 of the hat 2100. A Li-ion battery power source 2250 for the local electronic signal processing unit 2210 is positioned to the side of the crown 2102 and connected to the breadboard of the local electronic signal processing unit 2210 through a power cable 2251. The local electronic signal processing unit 2210 is also connected to a flash memory 2218, mounted on the same breadboard as the local electronic signal processing unit 2210, which can be used for local or temporary storage of processed signals. The local electronic signal processing unit 2210 is also connected to a Wi-Fi module 2270 with antenna 2271, which uses an IEEE 802.11n interface to serve as a transmitter for data to an off-hat (remote) computing system.

Also positioned on the crown 2102 of the hat is a auxiliary sensor module 2150, comprising in this embodiment two additional MEMS sensor devices: a MEMS accelerometer/gyroscope 2156 (in this prototype, an ST Microelectronics LSM6DSOX) and a MEMS compass 2158 (in this prototype, an ST Microelectronics LIS3MDL). Both MEMS sensor devices are also attached to an additional circuit board positioned on the crown of the hat, and also connected through the controller 2200 to the Wi-Fi module 2270, to allow the orientation and position data from the accelerometer 2156 and/or compass 2158 to be relayed to the Wi-Fi module 2270 and then transmitted to an off-hat (remote) signal processing computing system. In the prototype as implemented, the signals from the accelerometer 2156 and the compass 2158 both are passed into the local electronic signal processing unit 2210, where the timestamp from the clock used to synchronize the signals from the PDM microphones is also used to timestamp the orientation and position data before they are transmitted through the Wi-Fi module 2270 to the remote computer.

Figure 8:
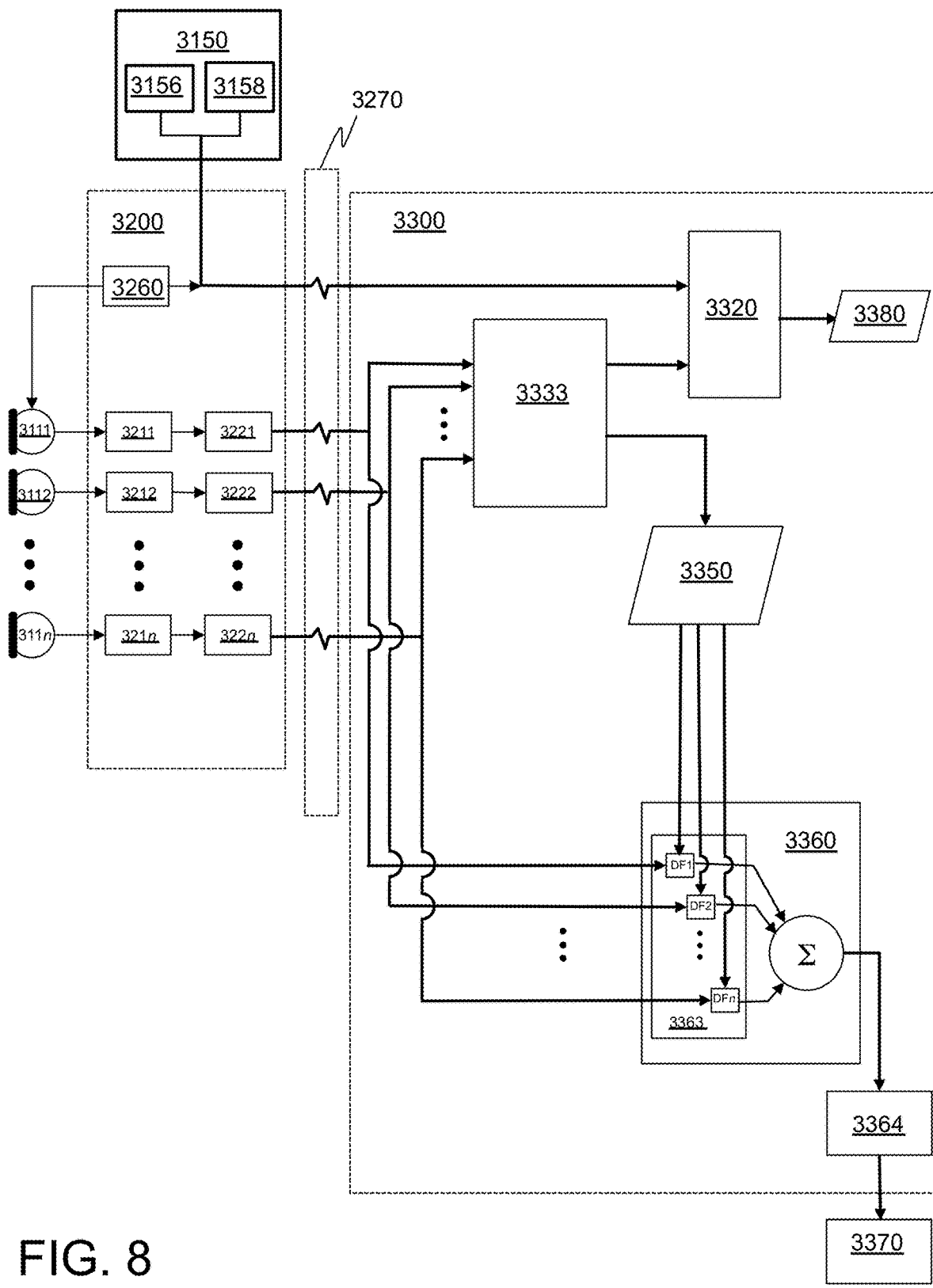
FIG. 8 illustrates a schematic block diagram for a portion of the signal flow for computations in an embodiment of the invention.

FIG. 8 illustrates schematically the signal processing functions for the prototype(s) previously described. FIG. 8 shows n PDM microphones 3111, 3112, ..., 311n (in the case of the prototype of FIG. 3, n=4, and for FIG. 7, n=8), a local electronic controller 3200 (which, in the embodiment of FIG. 3, corresponds to the Beaglebone computer included in 600, and in the embodiment of FIG. 7 corresponds to local electronic controller 2200), a Wi-Fi interface 3270, and a secondary signal processing unit 3300 (which, in the case of the prototypes described above, was implemented by software on a personal computer).

The local electronic controller 3200 also comprises a clock 3260 that sends clock signals to each of the n PDM microphones 3111, 3112, ..., 311n for synchronization. The local electronic controller 3200 also processes inputs from an auxiliary sensor module 3150 that, in this embodiment, comprises at least one accelerometer 3156 and one orientation sensor 3158 (such as a compass and/or a GPS system), and synchronizes the signals from these sensors with timestamps from the clock as well.

The local electronic controller 3200 processes each of the microphone signals with two sets of filters: a first filter and downsampling step 3211, 3212, ..., 321n, and then a second filtering and downsampling step 3221, 3222, ..., 322n. These processed signals, along with timestamped data from the accelerometer/gyroscope 3156 and compass 3158, are then transmitted using the Wi-Fi module 3270 to secondary signal processing unit 3300, in this case running signal processing software hosted on a personal computer (PC).

Within the secondary signal processing unit 3300, the processed signals from each of the n microphones are split, with one branch going to an Angle-of-Arrival Determination module 3333, and the other to a Beamformer module 3360. The time delay computation results 3350 (determined for each microphone signal) from the Angle-of-Arrival Determination module 3333 are then used by the Beamformer 3360 to synthesize a composite signal combined from the n microphones. Each microphone signal passes through a set of delay filters 3363 (marked in FIG. 8 as DF1, DF2, DFn) to compensate for the time delay for signals reaching the microphone due to the microphones being at different distances from the audio source. The composite signal is then used in any signal identification algorithms 3364 that may be present, and can be output 3370 from the system.

The secondary signal processing unit 3300 also is used to process the data from the accelerometer/gyroscope 3156 and compass 3158 in an orientation correction module 3320, and this position/orientation information may also be displayed or otherwise provided as output 3380 from the system for storage or display.

Figure 9:
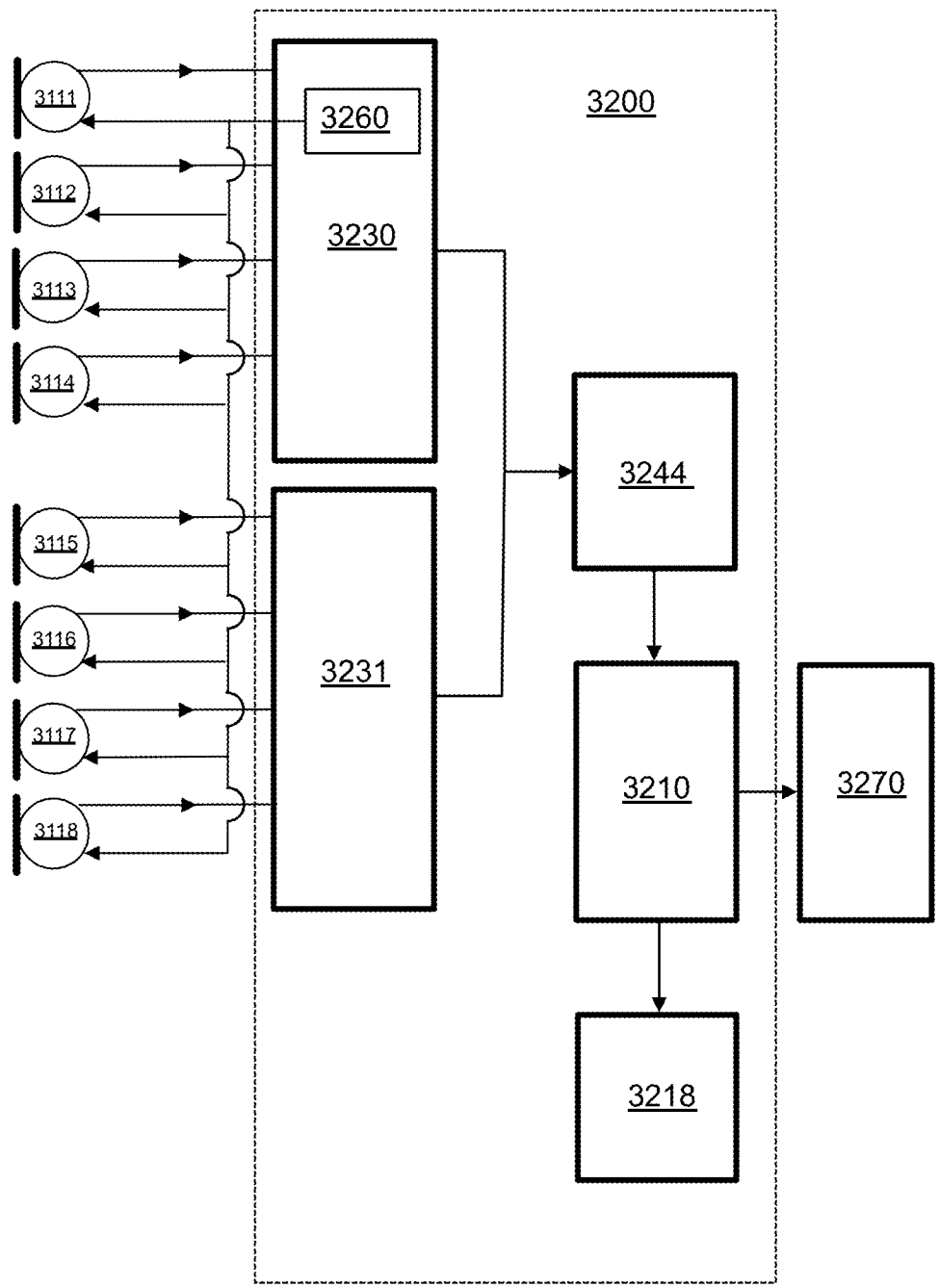
FIG. 9 illustrates a more detailed schematic block diagram for a portion of the signal flow for the embodiment shown in FIG. 8.

FIG. 9 shows a schematic illustration in more detail of the processing steps that take place in the local electronic controller 3200. The system as illustrated has eight (8) PDM microphones 3111-3118 and the local electronic controller 3200 has two (2) co-processors, PRU0 3230 and PRU1 3231. The clock 3260 that provides signals to coordinate the audio streams from all of the microphones is generated by co-processor PRU0 3230, while the audio streams from each of the PDM microphones are split for processing between the PRU0 3230 and PRU1 3231 processors.

These co-processors 3230 and 3231 carry out the steps of the first filter and downsampling step 3211-321n, illustrated in FIG. 8. After processing by the first filter and downsampling, the processed signals are stored in a circular buffer 3244 in memory, and then moved on to an ARM core 3210 for the second filter and downsampling steps 3221-322n, as illustrated in FIG. 8. After this processing, the resulting data can be stored in local flash memory 3218 and/or directly transmitted through the Wi-Fi interface 3270 to the secondary signal processing unit 3300.

Figure 10A:
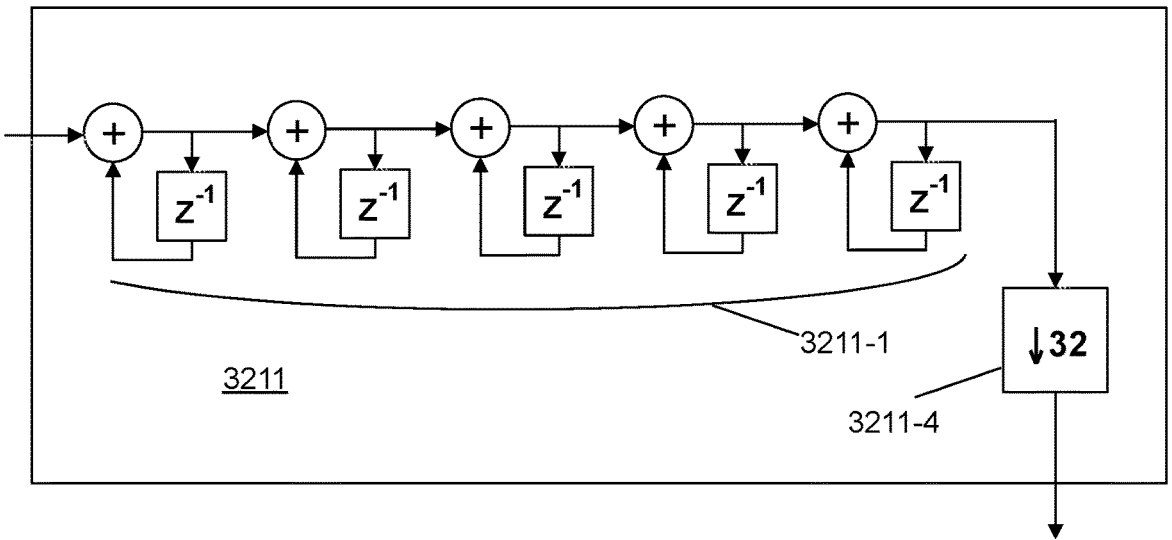
FIG. 10A illustrates a signal process used for the First Filter used for microphone signals for the embodiment shown in FIG. 8.

FIG. 10A shows a schematic illustration of the sequence of steps in the first filter and downsampling steps 3211-321n. The filter 3211 shown is for a single microphone signal, but implemented for each of the microphone data streams. The input is sampled at a frequency $F_s$ of 2.5 MHz (used with a clock speed of 200 MHz). This comprises a cascade integrator filter 3211-1 using five (5) stages of integration, with registers storing intermediate data results at each stage. This is followed by a downsampler 3211-4, which downsamples by a factor of 32 to produce an output frequency of ~78.125 kHz. In the prototypes, these signal processing steps are implemented on the PRU0 and PRU1 processors on the TI AM3358 processor contained in the Octavo system-on-chip (SoC) computer. In the prototypes discussed above, four (4) of the microphones are processed by the PRU0 processor, while four (4) are processed by the PRU1 processor.

Figure 10B:
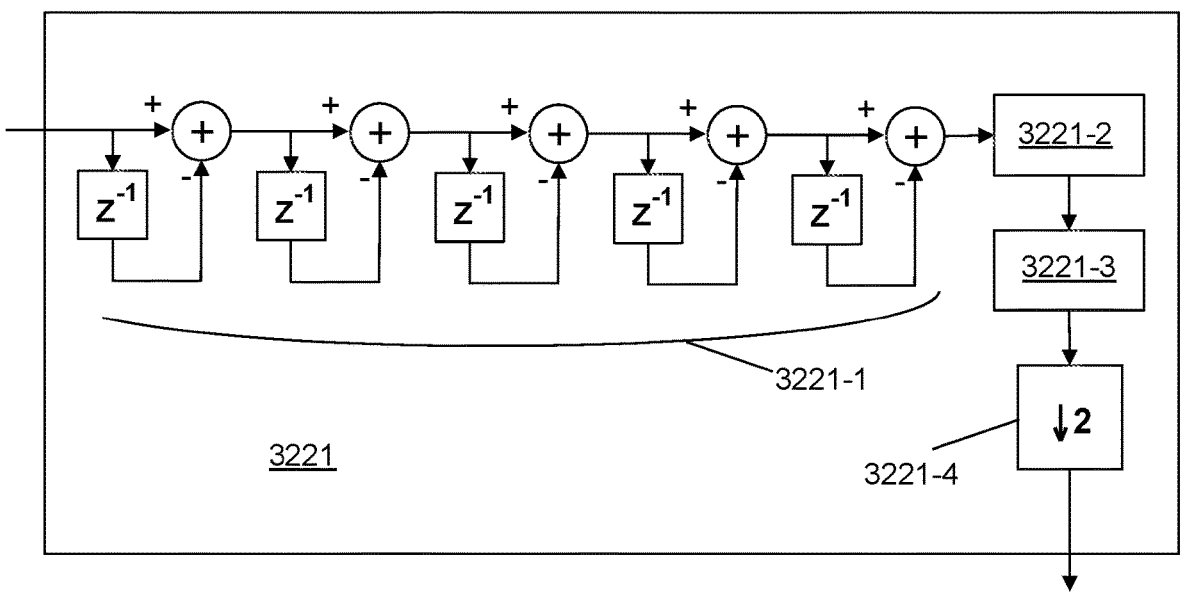
FIG. 10B illustrates a signal process used for the Second Filter used for microphone signals for the embodiment shown in FIG. 8.

FIG. 10B shows a schematic illustration of the second filter and downsampling steps 3221-322n. The filter 3221 shown is for a single microphone signal 3221, but implemented for each of the microphone data streams. This comprises a comb filter 3221-1, a high-pass filter 3221-2, and a finite-impulse-response (FIR) low-pass filter 3221-3, followed by a downsampler 3221-4 that downsamples by a factor of 2, converting the bitstream to 16 bit integers. This is second filtering step is implemented in the prototypes on the ARM Cortex-A8 processor contained in the Octavo system-on-chip (SoC) computer.

FIG. 10B shows a schematic illustration of the second filter and downsampling steps 3221-322n, shown for a single microphone signal 3221, but implemented for each of the microphone data streams. This comprises a comb filter 3221-1, a high-pass filter 3221-2, and a Finite-Impulse-Response (FIR) low-pass filter 3221-3, followed by a downsampler 3221-4 that downsamples by a factor of 2, converting the bitstream to 16 bit integers. This is second filtering step is implemented in the prototypes on the ARM Cortex-A8 processor contained in the Octavo system-on-chip (SoC) computer.

Figure 11:
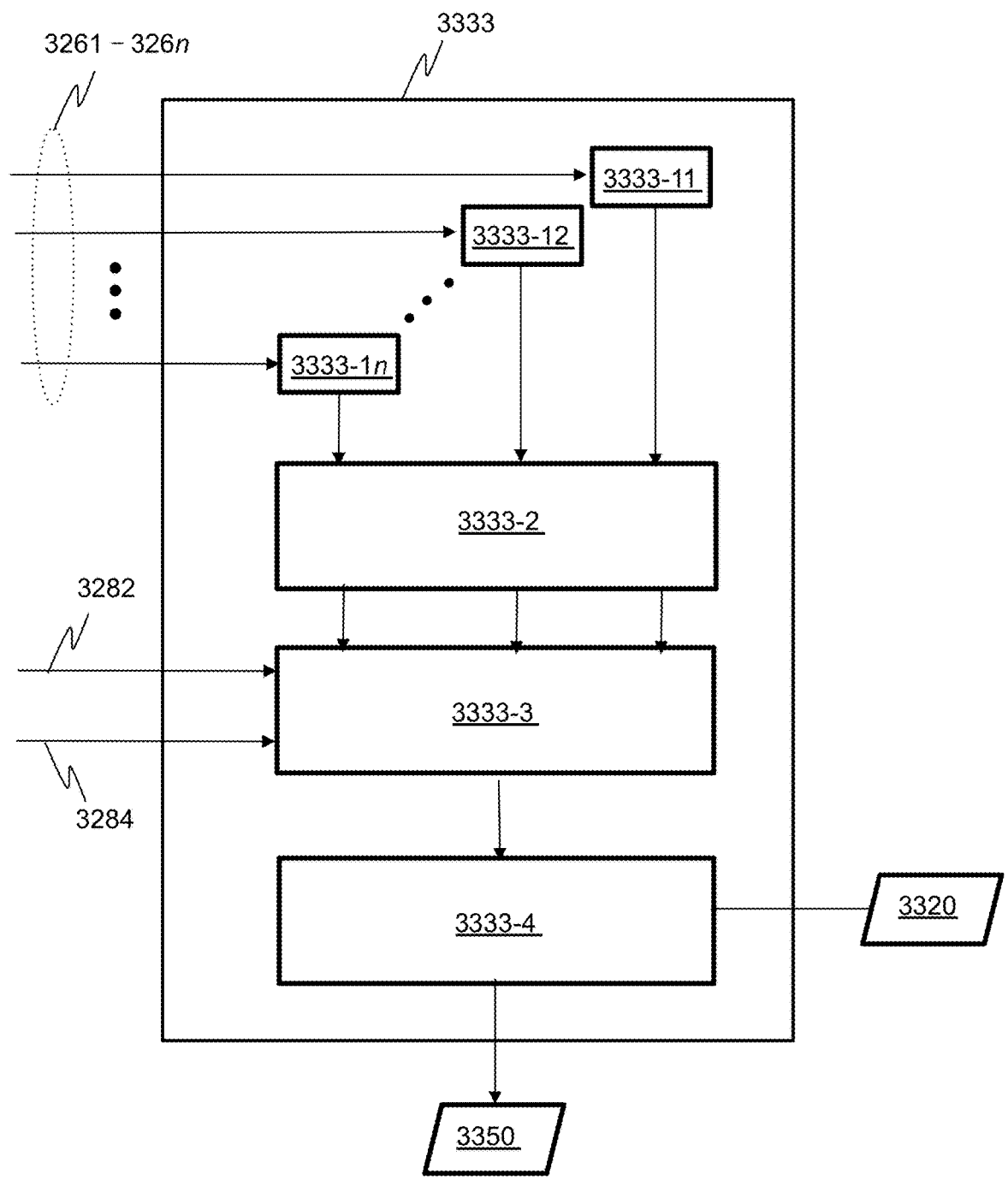
FIG. 11 illustrates a schematic of the processing steps used by the Angle of Arrival Determination portion of the embodiment shown in FIG. 8.

FIG. 11 shows a schematic illustration of the processing steps that take place in the Angle-of-Arrival Determination module 3333 in the secondary signal processing unit 3300. For the prototypes, these processing steps were implemented in MatLab on the secondary computer. Each of the processed time-based data streams (channels) 3261-326n from each of the PDM microphones undergoes a fast-Fourier Transform (FFT) (3333-11, 3333-12, ..., 3333-1n) to convert the signal from the time domain to the frequency domain. Then, in the next step 3333-2, the phase angles for each tone in each channel are estimated. Following that, in the next step 3333-3, the estimated phase angles are combined with data on the microphone position 3282 and the azimuth/elevation combinations 3284 to generate metrics such as the sum of cosine of the phase differences between measured angles and expected angle, and the microphone channels that correspond to the largest amplitudes for the frequencies of interest are determined. When the positions of those microphones are combined with the azimuth/elevation data from the accelerometer and the compass, metrics for comparing the expected angle and the computed angle can be calculated, and in the next step 3333-4, the estimate of the angle-of-arrival determined. These time delay computation results 3350 for the angle-of-arrival are and also transmitted to the Beamfinder 3360. Results are also transmitted to the orientation correction module 3320, where they are combined with accelerometer and compass data.

Figure 12:
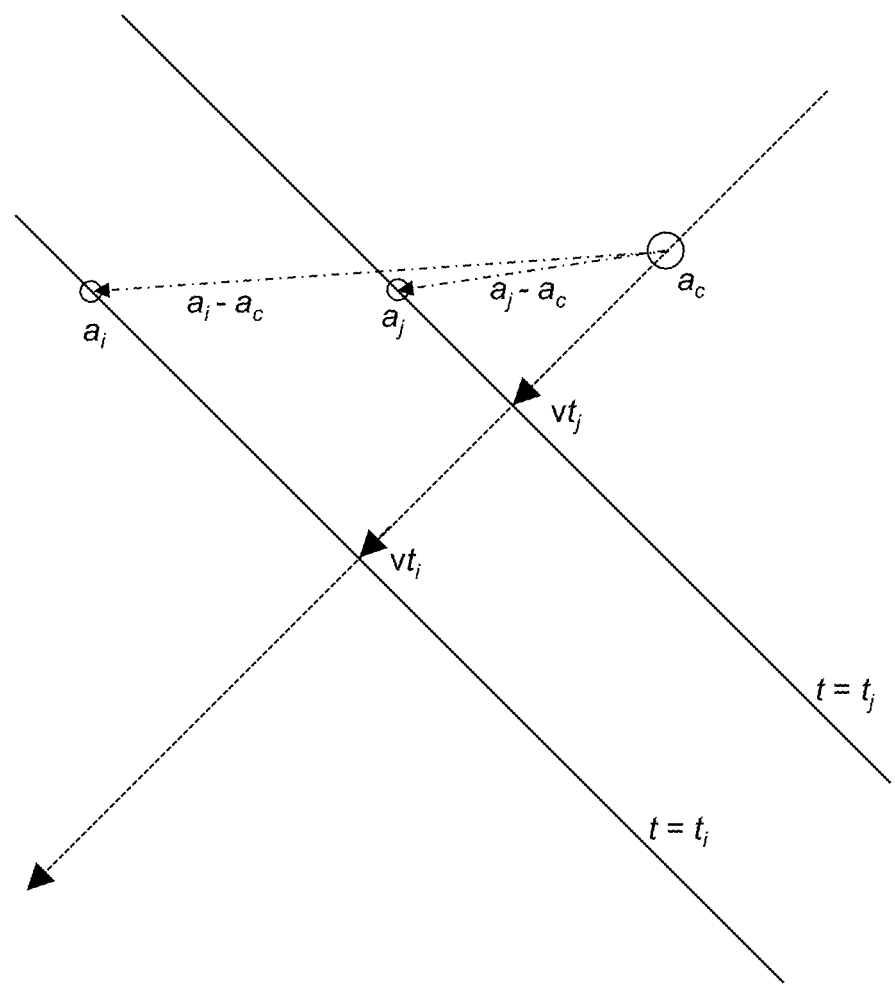
FIG. 12 illustrates the vectors used in the calculation of an Angle-of-Arrival Determination.

FIG. 12 illustrates the geometry used in the computations for the angle-of-arrival determination. A plane wave, shown with wavefronts at time $t_i$ and later at time $t_j$, propagates towards the microphone phase center, marked as $a_c$. The projection of each of the relative microphone location vector, $(a_i\text{-}a_c)$ onto the plane wave arrival vector v will be equal to the corresponding arrival time Thus, a set of linear equations can be determined from the set of projections. Since the locations $a_1$ are all known, the arrival vector v can be determined by solving the system of linear equations determined from the projections.

Figure 13A:
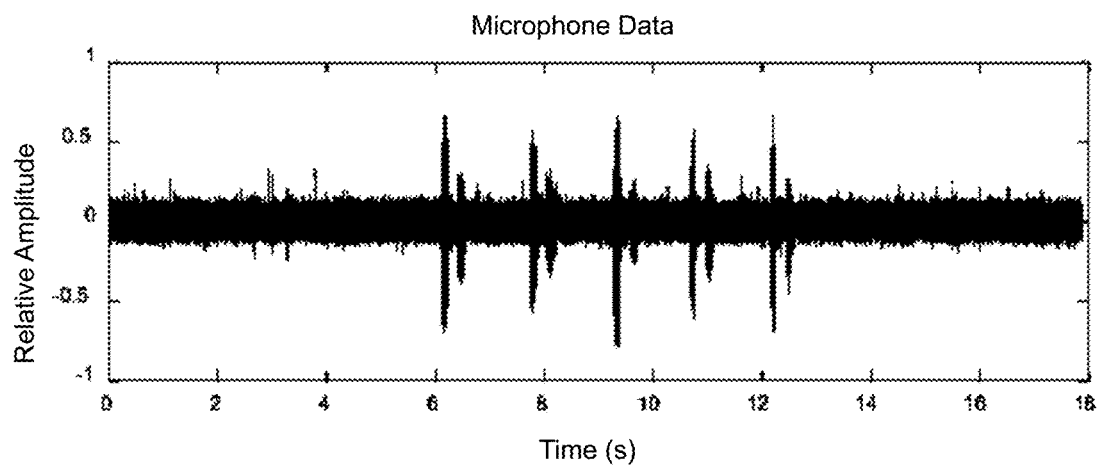
FIG. 13A illustrates an example of a set of acoustic data streams using a prototype with 8 microphones as shown in FIG. 7.
Figure 13B:
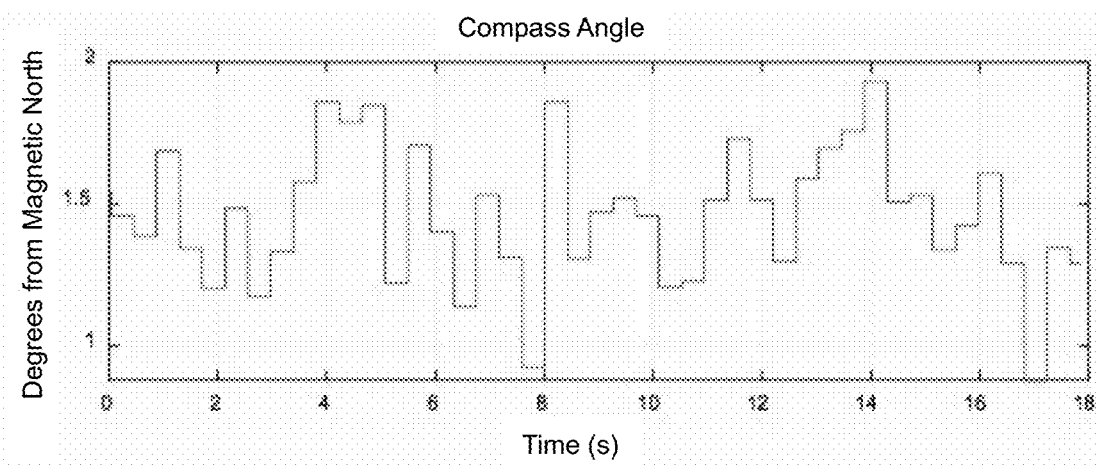
FIG. 13B illustrates the compass/orientation data simultaneously collected along with the acoustic data stream of FIG. 13A.

FIG. 13A illustrates an example of microphone amplitude signals as a function of time. Signals from all eight (8) of the microphones in the prototype are plotted superimposed on the same timescale, with each signal plotted using a different color. FIG. 13B illustrates a corresponding signal from the compass as used in the prototype. Both are logged using the same clock signals generated by PRU0, so that the computation of the estimate of the angle of arrival uses the corresponding synchronized compass and azimuth/elevation data. Note that, in the prototype as implemented, the sampling resolution of the compass signal happens to be significantly coarser than the sampling resolution for the signals from the microphones. This is dependent on the selection of the MEMS chip selected for the compass, and different implementations may use a compass signal with different or much higher resolution.

Figure 14:
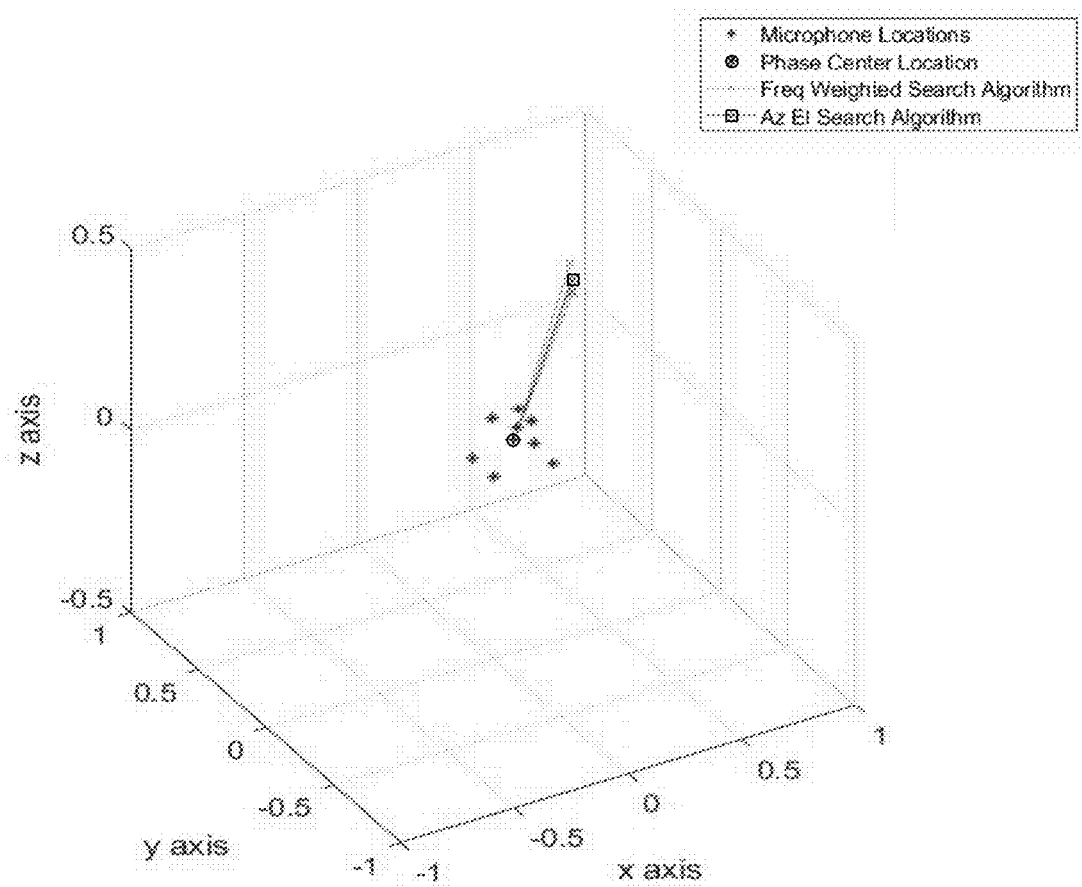
FIG. 14 illustrates a 3-D plot of microphone locations, along with computed vectors from acoustic signals for an embodiment of the invention.

FIG. 14 illustrates a 3-D plot of an example a calibration for the eight (8) microphones of the hat-based prototype, using a human speaker at an azimuth of approx. 45 degrees. The lighter line with an x symbol represents the frequency weighted phase angle comparison, while the darker line with a ⊠ symbol represents the computation based on the estimated time differences. The generally close agreement indicates an accurate angle of arrival estimation.

Figure 15:
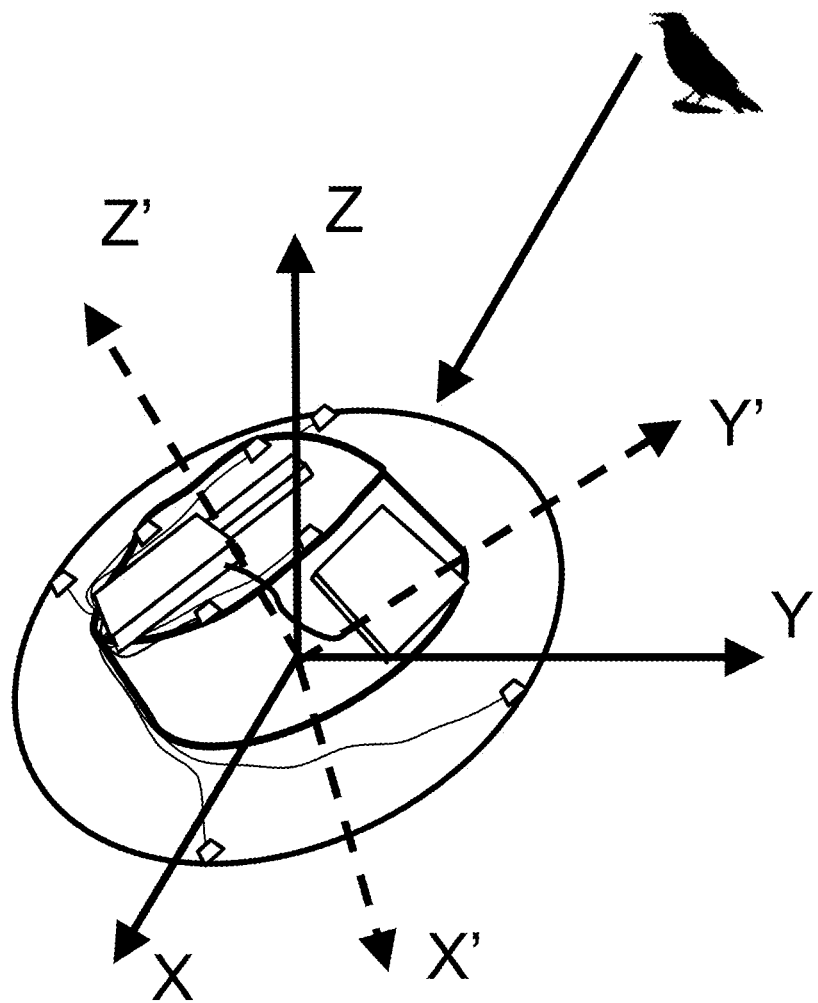
FIG. 15 illustrates the orientation of the reference vectors for computation for an embodiment of the invention.

FIG. 15 illustrates a 3-D plot of the various axes of orientation for the hat-based prototype, showing vectors for the relative orientation of the microphone array on the hat (X', Y', and Z') relative to the Earth (X, Y, and Z). The microphone array can be used to first determine the location of the wildlife relative to the orientation of the microphone array on the hat. The processor can then use this information and the orientation of the microphone array on the hat relative to determine the location of the wildlife relative to the Earth.

Figure 16:
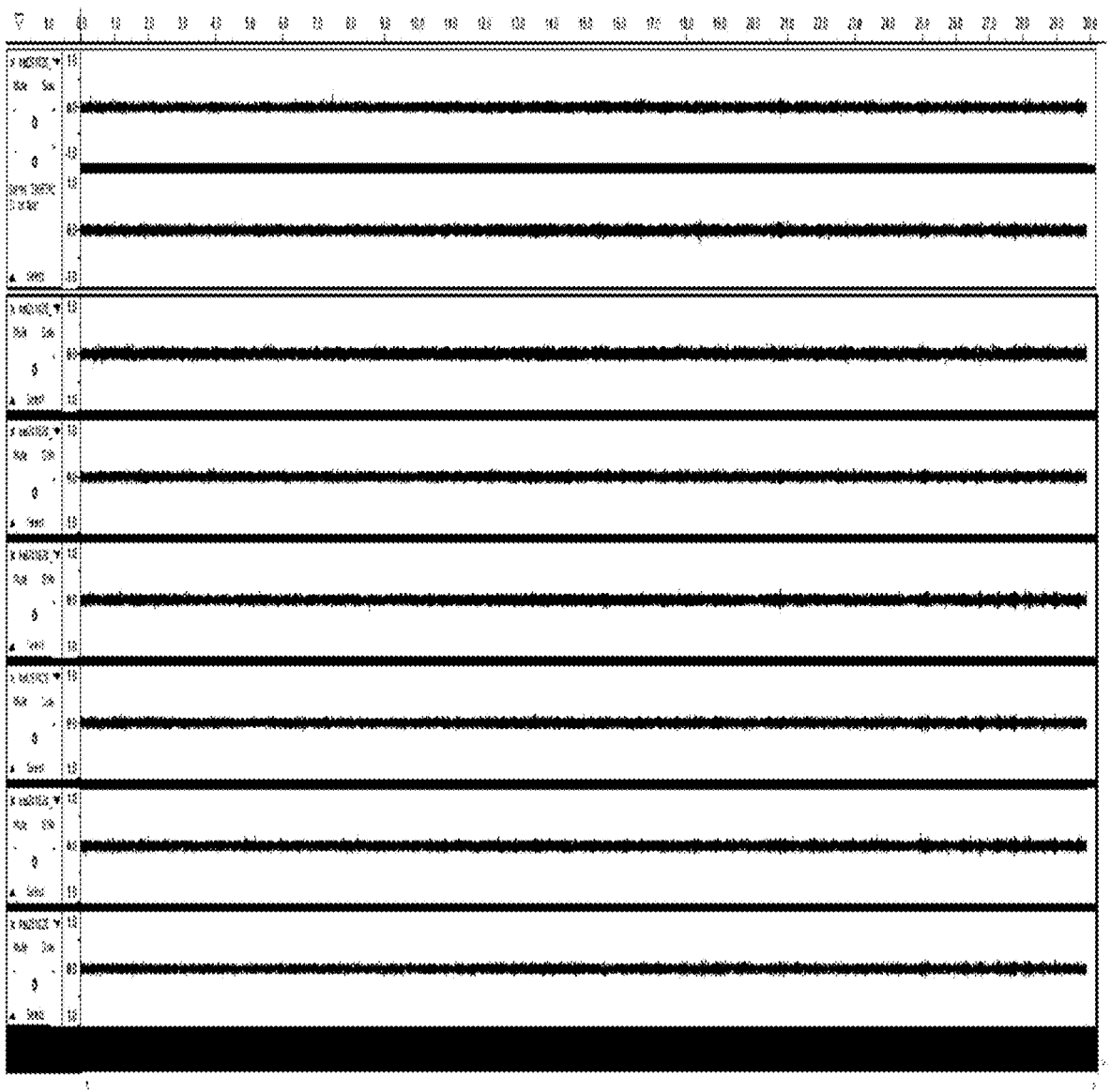
FIG. 16 illustrates eight (8) acoustic data streams using a prototype with 8 microphones as illustrated in FIG. 7.

FIG. 16 shows an example of eight (8) audio datastreams from the hat-based prototype of FIG. 7 after processing by the first and second filters and downsampling signal processing steps as illustrated in FIGS. 10A and 10B. The timescale of the audio streams in FIG. 16 is seconds, and on this timescale, the amplitude of the various audio data streams is small and somewhat noisy.

Figure 17:
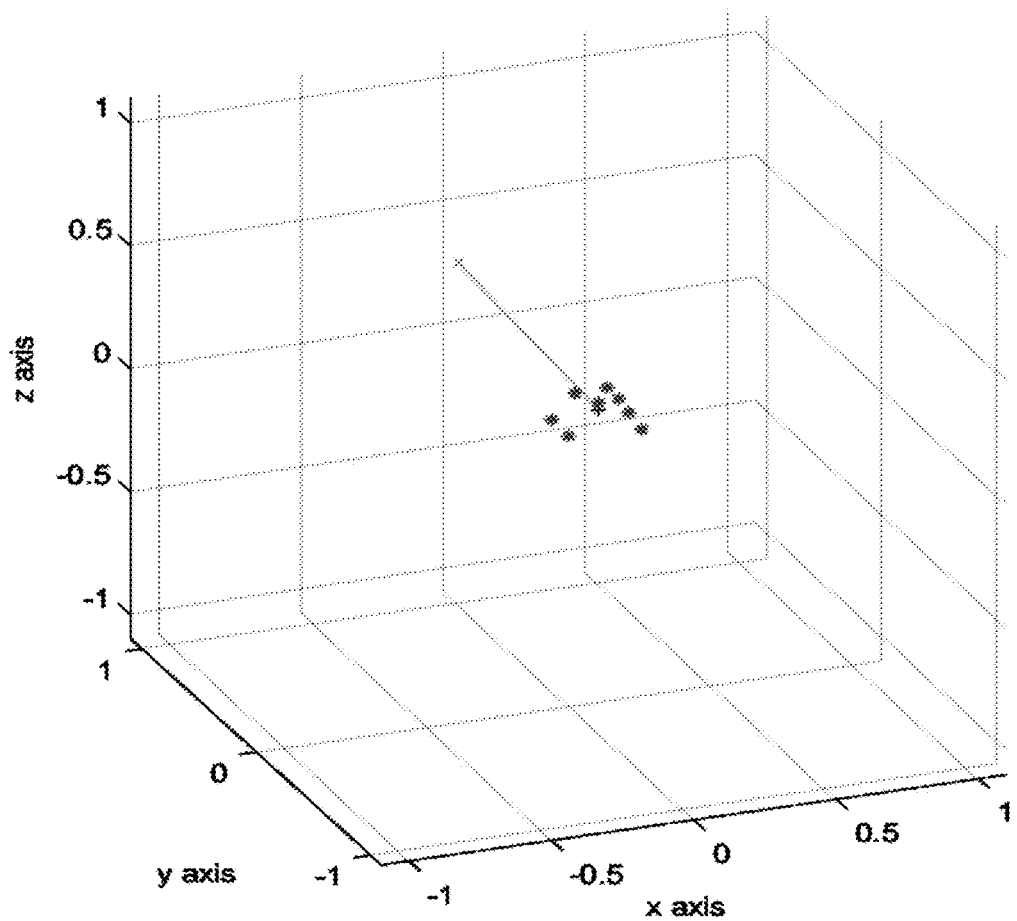
FIG. 17 illustrates computed reference vectors for the data streams of FIG. 16.

FIG. 17 illustrates the computed vectors for the signals of FIG. 16, showing the identification of a mockingbird located at an azimuth of 96 degrees and an elevation of 12 degrees from the phase center of the microphone array, as determined using the Angle-of-Arrival Estimator algorithm.

Figure 18:
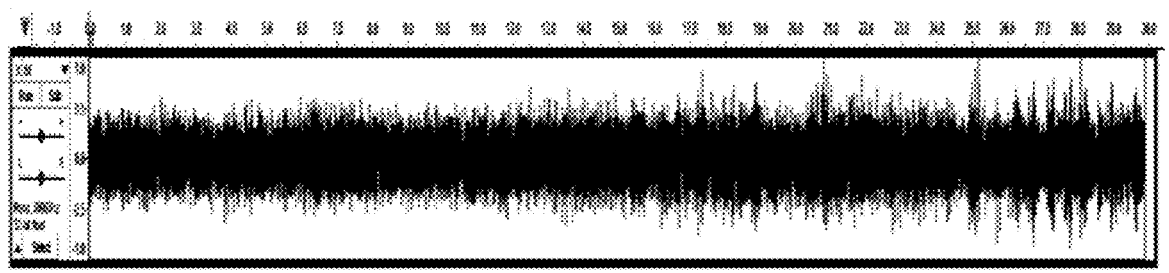
FIG. 18 illustrates a combined acoustic data stream assembled from the eight (8) data streams of FIG. 16.

FIG. 18 shows an example of the synthesized result of the delay and sum Beamformer software, synthesizing a single audio stream from the eight (8) audio datastreams illustrated in FIG. 16. The amplitude and signal-to-noise ration are much larger, and can be submitted to a bird-song recognition algorithm that recognized this as a mockingbird song.

IV. Data Collection and Signal Processing Implementations

The microphone array can be used to determine either source angle-of-arrival (i.e. azimuth and elevation) or complete source position (azimuth, elevation, and distance). Calculation of only source angle-of-arrival may be preferable for situations involving wildlife and long distances where accurate measurement of the distance is not possible.

Accuracy of the distance measurement improves with larger numbers of microphones and with larger overall size of the microphone array. A minimum of four microphones is needed to determine the complete source position. Mathematically, this is true because the g(u) matrix and gradient of the g(u) matrix (described in more detail in the attached Appendix) must be of rank 4. More intuitively, it is understood that with four (4) microphones, it is possible to compute three time-differences relative to a reference time from one of the microphones. These three time-differences are then used in a system of three (3) equations to determine the three (3) coordinates (azimuth, elevation, and range) of the sound source.

Precise determination of the time-differences requires phase response matching from the individual microphones, as relative time delays are determined from phase differences and lack of matching will introduce errors into the measurements. This is best accomplished with PDM microphones in which a single, high speed clock reference is used for each microphone in the array. For many applications, MEMS PDM microphones are used because these have precise phase matching characteristics and very low cost.

PDM Microphone characteristics that are useful for location measurement are:

a) Precise time synchronization using a common clock signal provided to each device (this helps to maintain phase match between microphones);
b) A digital interface, to avoid picking up electrical noise on circuit board having other nearby high speed electronics (such as the processor);
c) High sensitivity, to pick up audio calls of birds at a distance;
d) Low power consumption, for longer battery operation;
e) Using matched PDM microphones of the same type in the array, with an amplitude match of +/−1 dB (10%) and a phase match of +/−2 degrees.

High sensitivity and phase match are the most important characteristics for the PDM microphones. High sensitivity is necessary to achieve a high signal-to-noise ratio (SNR) in the measured signals. High SNR and low phase errors allow precise measurement of the time delays in arriving signals between microphones, thus allowing the determination of the location of the sound source. Using microphones from the same manufacturer and from the same manufacturing lot can also minimize the relative errors in the phase measurements.

A phase error of 2 degrees corresponds to an error of about 1% in the time measurement. This will result in a distance measurement error of about 1% when the distance to the source is roughly equal to the size of one the dimensions of the microphone array. When the distance to the source scales upward, say to 10 times the size of the microphone array, then the error can increase to close to 50%. This error can be reduced significantly by adding additional microphones and averaging over the phase measurements. Calibration techniques can also be used to reduce errors. The best solution is to use as many PDM microphones as practical from the same manufacturer and to calibrate the microphone array for phase errors when measuring a source at a distance that is the same as what is expected in the field.

Although software to implement the algorithms described in the previous section, and signal processing systems may be written using any number of programs, for the prototypes described above, three (3) levels of software were used.

First, assembly code was used for processes taking place in the PRU0 and PRU1 processors on TI AM3358 SoC (system on a chip). This code provides the clock to the microphones and captures the 1 bit per sample (at 2.5 MHz sampling rate) PDM data from each microphone, filters it with the $5^{th}$ order cascade integrator filter, and downsamples it by a factor of 32. The resulting 32 bit samples (sampled at 78.125 KHz per channel) are written into a circular buffer that can be read by the ARM A8 core. This circular buffer is allocated with a device driver that is loaded at startup time.

Second, code written in the C programming language is running on the ARM A8 core on the TI AM3358 SoC. This C code pulls the 32 bit samples out of the circular buffer and applies the $5^{th}$ order comb filters, single order high pass filters, FIR (finite impulse response) filters and downsamples by a factor of 2. After this, the samples are rounded to 16 bit signed integers. The C code also captures the compass and accelerometer data. The resulting data is packaged into frames and sent to Linux standard output (stdout). From there the data is either piped to a file or to a networking utility (netcat) for a network connection to a Windows 10 PC. Wireless transmission may occur using User Datagram Protocol (UDP) packets and IEEE 802.11n protocols.

Third, Matlab code running on the Windows PC is used to perform the angle-of-arrival calculations, delay and sum Beamforming operations, and for plotting. Data files are first parsed to separate the compass and accelerometer data. The microphone samples are written to .wav files in both 8 channel form and when combined via beamforming to a single channel.

Matlab can also be used for testing and debugging. The "Audacity" program is used for viewing and playing captured data in .wav files. Matlab may also be used for simulating portions of the C code that are hard to test and verify by themselves.

Although the implementation of prototypes for embodiments of the invention as described above have been executed by doing some calculations, such as the angle-of-arrival computation and the Beamforming operations, on a remote computer, other implementations in other embodiments may provide for these functions to be implemented on a computer also attached to the same structures (e.g. a hat) used for the initial signal processing. And, although the present implementations also use separate electronic integrated circuits or circuits for the on-hat computation, flash memory, wireless transmission, and the compass/accelerometer data collection, other embodiments may integrate some or all of these functions into a single integrated circuit having a more elaborate system-on-chip (SoC) design.

V. Position Calibration.

For the calculated phase delays of corresponding signals from the various microphones in the microphone array to be used to accurately, a calibration procedure may be used. For this, sounds of a known frequency from known positions relative to the microphone array are generated, and the signals processed and analyzed. Preferably, calibration sources at several values of azimuth and elevation may be used in order to adjust the computations to accurately produce computed results corresponding to the known relationships in the calibration.

For a rigid, unchanging configuration for the microphone array, calibration may be carried out at the manufacture. If the microphone array is to be assembled at the user's location, by, for example, clipping microphones onto the brim of a hat, some kind of calibration in the field may be needed. This calibration may be provided by placing the microphone array and a mobile phone at a known position (using, for example, the phone's GPS location software), and then placing the microphone array at a distance from the mobile phone, with the new array position tracked using position sensors on the microphone array (e.g. internal accelerometers). Using an app downloaded to the mobile phone, the phone can then "chirp" at designated frequencies, to be detected by the microphone array and processed. Since the relative positions of the microphone array and the sound source are known, calibration can be achieved.

VI. Bird Identification.

The birdfinding apparatus described so far simply detects acoustic signals and processes them. However, in some embodiments, programming in either the local signal processing unit or on the remote signal processing unit may be provided to execute pattern recognition for time dependent spectra of various detected acoustic signals. The patterns the software is trained to identify would correspond to various known bird calls that are likely to be present in the geographic area in which the birdfinder is being used.

The programming may take the form of specialized filtering algorithms that recognize the initial acoustic signatures of a vocalization, and initiate a filter to look for that signature while removing ambient noise. The programming may also take the form of simple passive computation of broad-spectrum acoustic behavior, and carrying out a rapid comparison to a library of bird calls to estimate bird species.

In some embodiments, an pattern recognition techniques using various recently developed artificial intelligence (AI) methods that involve "training" a pattern recognition system with a large number of previously identified bird songs to allow new songs to be recognized may be applied. Since these often require rather large databases to be accessible, this may be carried out using the remote processing device in conjunction with a possible tertiary processing system, which may be a remote computer "in the cloud" and accessed through the Internet. Such access to a remote database may allow for the experience of many to be pooled for better recognition and identification of birds and their songs.

In some embodiments, audio pattern recognition can be enabled by first computing a spectrogram from the audio signals from the microphone array. Such a spectrogram can be formed using a sequence of fast Fourier transforms over sections of the captured signal to generate a two-dimensional signal representation. The spectrogram will show the frequency and timing repetitions of the sounds that make up the birdsong. Comparison of a measured spectrogram with stored spectrograms of known birdsongs can be made using a neural network that recognizes similar patterns in the frequency and repetitions. Comparisons of measured spectrograms can be made directly with stored spectrograms. In some embodiments, the spectrograms can be automatically transcribed into standard musical notation with musical notes on a staff. This can be displayed to the user for manual comparison or used as an intermediate step in comparison with known birdsongs.

The computation of such a spectrogram and the comparison with a library of birdsongs will typically be carried out using the secondary electronic signal processing unit (e.g. a laptop or a smartphone). However, it is possible that some of these spectrographic computations may be also carried out at the local signal processing unit. In some embodiments, it may be possible to actually have a set of "active filters" in the local signal processing unit that recognize the spectrographic signature of a particular bird vocalization, and "turn on" in response, dynamically filtering the audio input to seek only bird calls of the selected type. This may provide the advantage of selecting and identifying a particular bird species in a particularly cacophonous environment.

VII. Additional Options.

Although several embodiments of the invention have been described, those skilled in the art may recognize that other options are possible.

In some embodiments, only a single, local signal processing computer for computations may be used, with all computational signal processing of acoustic signals taking place using a computer as a local signal processing unit placed in a controller directly connected to the microphone array. In some embodiments, this local computational signal processing unit may be also mounted to the same substrate (e.g. a hat) to which the microphones are mounted.

In some embodiments, the microphone array is attached to an article of clothing, such as a hat. In some embodiments, the microphone array may be attached to a shirt, a jacket, or some other article of clothing to be worn by a person. In some embodiments, the microphone array may be attached to an object such as a backpack, or a structure to be carried in a backpack, or some other object to be worn on a human body.

In some embodiments, as described above, a visual display of the identified direction of origin of the bird vocalization may be presented, while in some embodiments, an acoustic notification such as an easily recognizable beeping sound positioned to come from the same direction to the user as the bird vocalization may be provided.

In some embodiments, the local controller only provides a passive forwarding of the acoustic signals to a remote signal processing system, and does no or minimal signal processing locally. This may provide some level of battery power conservation for the local microphone array system.

In some embodiments, many microphones may be provided with known relative positions, but not be positioned in a regular, periodic array. In some embodiments, the microphones are positioned as a regular, periodic array.

In some embodiments, the microphone array may be attached to a processing controller, such as smartphone, directly, and none of the microphones may be worn on some item of the birdwatchers clothing (such as a hat). In some embodiments, the microphone array may be configured in one handheld unit, while being wirelessly connected to a remote processing system contained within a smartphone via Wi-Fi connection.

Although the embodiments of the invention described here have been for the purpose of rapidly and automatically recognizing bird calls, and providing relative geographic information for the origins of the bird calls, the techniques described here can be applied to any source of acoustic signals where the direction/location can be determined, and identification can be automated. Such acoustic sound sources may be human voices, animal calls, automobiles in traffic, ships in harbors, gunshots in neighborhoods and the like.

Use of microphone arrays as described here may be used for the location and identification of human voices, and can be used to rapidly locate lost children, pets, or criminal suspects in a noisy environment. Location and identification of noise sources could be used for diagnosing mechanical faults or identifying violations of noise ordnances. Location and identification of ship horns or bells could be used in safe navigation in fog or other inclement weather. Location and identification of gunshots could be used in military, special operations, security or law enforcement.

Additional information may be found in the attached Appendix, entitled "ARBITRARY ARRAY BEARING AND RANGE COMPUTATIONS" (6 pages).

With this Application, several embodiments of the invention, including the best mode contemplated by the inventors, have been disclosed. It will be recognized that, while specific embodiments may be presented, elements discussed in detail only for some embodiments may also be applied to others.

While specific materials, designs, configurations and fabrication steps have been set forth to describe this invention and the preferred embodiments, such descriptions are not intended to be limiting. Modifications and changes may be apparent to those skilled in the art, and it is intended that this invention be limited only by the scope of the appended claims.

What is claimed is:

1. An apparatus for detecting bird vocalizations, comprising:
   an electronic controller that outputs a common clock signal;
   a microphone array, comprising a plurality of microphones,
      wherein each microphone in the array is positioned such that each microphone in the array has a predetermined relationship relative to each of the other microphones in the array,
      said relationship including relative orientation, position, and distance between microphones; and
      wherein each of the microphones in the array is synchronized using the common clock signal provided as input to each microphone in the microphone array;
      and wherein one or more of the plurality of microphones is a pulse density modulation (PDM) Microphone; and
   a local signal processing unit,
      connected to, and providing the common clock signal from the electronic controller to, each of the microphones in the microphone array, and
      configured to receive electronic signals from each of the microphones in the microphone array and perform signal processing on the received signals,
      wherein the signal processing performed on the received signals uses a filter comprising a cascade integrator filter followed by a downsampler;
   an electrical power source that provides electrical power for at least the microphone array and the local signal processing unit; and
   a computational signal processing unit,
      configured to receive processed signals originally generated from two or more of the microphones in the microphone array, and
      to further process the received signals to compute a direction of origin corresponding to a sound detected by the microphone array,
      said direction of origin represented by at least an azimuth and an elevation.

2. The apparatus of claim 1, wherein
the microphone array has at least four microphones, and each microphone in the microphone array is a PDM MEMS microphone.

3. The apparatus of claim 1, wherein:
the computational signal processing unit is additionally configured to process the received signals to compute a distance corresponding to the sound detected by the microphone array.

4. The apparatus of claim 1, additionally comprising:
a transmitter connected to the local signal processing unit, configured to relay processed signals from the microphone array after processing by the local signal processing unit; and
a remote signal processing unit comprising:
   a receiver for processed signals from the transmitter, and
   a second signal processing unit configured with software that allows it to serve as said computational signal processing unit.

5. The apparatus of claim 4, wherein:
the transmitter comprises a wireless communication broadcasting device.

6. The apparatus of claim 5, wherein:
the wireless communication broadcasting device transmits using wireless radio frequencies, and the wireless radio frequencies follow a protocol conforming to IEEE standard 802.11.

7. The apparatus of claim 1, additionally comprising:
one or more accelerometers, positioned to detect changes in position and/or orientation for one or more of the microphones in the microphone array.

8. The apparatus of claim 4, additionally comprising:
one or more accelerometers, positioned to detect changes in position and/or orientation for one or more of the microphones in the microphone array, wherein the local signal processing unit is also connected to the one or more accelerometers, and relays signals from the one or more accelerometers to the transmitter.

9. The apparatus of claim 1, additionally comprising:
one or more orientation devices, positioned to detect the orientation of one or more of the microphones in the microphone array relative to the Earth.

10. The apparatus of claim 4, additionally comprising:
one or more orientation devices, positioned to detect the orientation of one or more of the microphones in the microphone array relative to the Earth, wherein
the local signal processing unit is also connected to the one or more orientation devices, and relays signals from the one or more orientation devices to the transmitter.

11. The apparatus of claim 1, wherein
the computational signal processing unit is configured to compute data about an angle-of-arrival relative to the microphone array based on the computed direction of origin; and
the computational signal processing unit additionally comprises a module to synthesize an audio stream from a plurality of electronic signals from the microphones in the microphone array,
   wherein each of the electronic signals used in the synthesis has a delay applied by a delay filter,
      with the delay for each of the electronic signals computed using the data about the angle-of-arrival.

12. The apparatus of claim 11, additionally comprising:
a display configured to show the computed direction of origin.

13. The apparatus of claim 12, wherein:
a computing device, selected from the group consisting of a personal computer, a laptop computer, a smartphone, and a tablet, is used as the computational signal processing unit, and said display corresponds to a built-in display in the computing device.

14. The apparatus of claim 1, wherein
the local signal processing unit is programmed to identify signals of at least one predetermined frequency spectrum,
   said predetermined frequency spectrum corresponding to
      a predetermined species of bird; and
the predetermined relative distance between each microphone of the array relative the nearest neighboring microphone in the array is less than ½ the wavelength of an acoustic wave corresponding to the center band of the predetermined frequency spectrum.

15. The apparatus of claim 1, wherein
the electrical power source comprises a source of electricity selected from the group consisting of: a battery and a solar cell.

16. The apparatus of claim 1, wherein
a plurality of the microphones of the microphone array are attached to an object to be worn on a human body.

17. The apparatus of claim 16, wherein
the object to be worn on a human body is a hat.

18. The apparatus of claim 8, wherein
the signals from the one or more accelerometers relayed to the transmitter are synchronized with timestamps from the common clock signal.

19. The apparatus of claim 10, wherein
the signals from the one or more orientation devices relayed to the transmitter are synchronized with timestamps from the common clock signal.

20. The apparatus of claim 1, wherein
the signal processing performed on the received signals additionally uses a second filter comprising at least one of a comb filter, a high-pass filter, and a finite-impulse response low-pass filter followed by a second downsampler.

21. A system for detecting bird vocalizations, comprising:
an electronic controller that outputs a common clock signal;
a microphone array, comprising at least four PDM microphones,
   wherein each microphone in the array is positioned such that each microphone in the array has a predetermined relationship relative to each of the other microphones in the array,
      said relationship including relative orientation, position, and distance between microphones, and
   wherein each of the microphones in the array is synchronized using the common clock signal provided as input to each microphone in the microphone array;
a local signal processing unit,
   connected to, and providing the common clock signal from the electronic controller to, each of the microphones in the microphone array, and
   configured to receive electronic signals from each of the microphones in the microphone array
   and perform signal processing on the received signals,
wherein the signal processing performed on the received signals uses a filter comprising a cascade integrator filter followed by a downsampler;
a transmitter connected to the local signal processing unit, configured to relay processed signals from the microphone array after processing by the local signal processing unit;

an electrical power source that provides electrical power for at least the microphone array and the local signal processing unit; and a remote signal processing unit comprising:

a receiver for processed signals from the transmitter, and a second signal processing unit configured to serve as a computational signal processing unit, programmed to receive processed signals originally generated from the at least four PDM microphones in the microphone array, and to further process the received signals to compute a direction of origin and a distance corresponding to a sound detected by the microphone array, said direction of origin represented by at least an azimuth and an elevation.

22. The system of claim 21, wherein the computational signal processing unit is configured to compute data about an angle-of-arrival relative to the microphone array based on the computed direction of origin; and the computational signal processing unit additionally comprises a module to synthesize an audio stream from a plurality of the electronic signals from the microphones in the microphone array, wherein each of the electronic signals used in the synthesis has a delay applied by a delay filter, with the delay for each of the electronic signals computed using the data about the angle-of-arrival.

23. The system of claim 21, wherein a plurality of the microphones of the microphone array are attached to an object to be worn on a human body, wherein the object to be worn on a human body is selected from the group consisting of a hat, a shirt, a jacket, and a backpack.

24. The system of claim 21, wherein the signal processing performed on the received signals additionally uses a second filter comprising at least one of a comb filter, a high-pass filter, and a finite-impulse response low-pass filter followed by a second downsampler.

* * * * *